(12) United States Patent
Williams

(10) Patent No.: US 7,334,728 B2
(45) Date of Patent: *Feb. 26, 2008

(54) METHOD AND SYSTEM FOR INTERACTIVELY PROVIDING PRODUCT RELATED INFORMATION ON DEMAND AND PROVIDING PERSONALIZED TRANSACTIONAL BENEFITS AT A POINT OF PURCHASE

(75) Inventor: Peter Williams, Mosman (AU)

(73) Assignee: Williams Patent Licensing PLC Limited Liability Company, Wilmington, DE (US)

( * ) Notice: Subject to any disclaimer, the term of this patent is extended or adjusted under 35 U.S.C. 154(b) by 353 days.

This patent is subject to a terminal disclaimer.

(21) Appl. No.: 10/866,648

(22) Filed: Jun. 11, 2004

(65) Prior Publication Data

US 2005/0055281 A1   Mar. 10, 2005

Related U.S. Application Data

(63) Continuation-in-part of application No. PCT/IB02/05280, filed on Dec. 11, 2002, which is a continuation of application No. 10/023,364, filed on Dec. 13, 2001, now Pat. No. 6,641,037.

(51) Int. Cl.
   *G06K 15/00*   (2006.01)
(52) U.S. Cl. .................. 235/383; 235/381; 235/462.45
(58) Field of Classification Search ............... 235/383, 235/378, 379, 380, 381, 462.01, 462.45; 705/14, 16, 17, 18, 2
   See application file for complete search history.

(56) References Cited

U.S. PATENT DOCUMENTS 4,505,682 A    3/1985   Thompson
5,059,126 A   10/1991   Kimball
5,406,024 A    4/1995   Shioda
5,825,002 A * 10/1998   Roslak .................... 235/375
5,894,119 A    4/1999   Tognazzini (Continued)

FOREIGN PATENT DOCUMENTS

| KR | 2002022845 | * | 3/2006 |
| WO | WO 00/43912 | | 7/2000 |
| WO | WO 00/45302 | | 8/2000 |

OTHER PUBLICATIONS

Guernsey, Lisa, "Scan the Headlines? No, Just the Bar Codes: Encoding Technologies for Newspapers and Magazines Link Printed Page to Web Pages", The New York Times, May 4, 2000, 5 pages.

(Continued)

*Primary Examiner*—Daniel StCyr
(74) *Attorney, Agent, or Firm*—Sterne, Kessler, Goldstein & Fox PLLC

(57) ABSTRACT

The present invention provides a system and method for interactively providing product and related information to a user based upon product identification information, such as a UPC code, and enabling the user to engage in various transactions related to the product. According to one aspect of the present invention, the system informs and educates the user about a particular product or service which the user is interested in and enables the user to efficiently purchase the product or service. The system is also configured to offer personalized transactional benefits to the user based on the amount and/or type of personal information that is provided by the user. According to one aspect, a mobile device with a camera can be used as the means for reading and processing product and service identifying indicia.

30 Claims, 15 Drawing Sheets

U.S. PATENT DOCUMENTS

| | | | |
|---|---|---|---|
| 5,905,248 A | 5/1999 | Russell | |
| 5,918,211 A * | 6/1999 | Sloane | 705/16 |
| 5,933,813 A | 8/1999 | Teicher | |
| 5,938,727 A | 8/1999 | Ikeda | |
| 5,969,324 A | 10/1999 | Reber | |
| 5,978,773 A | 11/1999 | Hudetz | |
| 5,979,757 A * | 11/1999 | Tracy et al. | 235/383 |
| 6,012,102 A | 1/2000 | Shachar | |
| 6,018,650 A | 1/2000 | Petsko | |
| 6,027,024 A | 2/2000 | Knowles | |
| 6,123,259 A | 9/2000 | Ogasawara | |
| 6,129,274 A | 10/2000 | Suzuki | |
| 6,314,406 B1 | 11/2001 | Ohagan | |
| 6,327,570 B1 | 12/2001 | Stevens | |
| 6,434,530 B1 * | 8/2002 | Sloane et al. | 705/1 |
| 6,641,037 B2 * | 11/2003 | Williams | 235/383 |
| 7,066,387 B2 * | 6/2006 | Itoh et al. | 235/382 |
| 2002/0117544 A1 | 8/2002 | Wolf | |
| 2002/0143626 A1 | 10/2002 | Voltmer | |

OTHER PUBLICATIONS

Kaufman, Leslie, "Speaking in Bar Code: Personal Scanners Link Products Directly to Consumers", The New York Times, Oct. 6, 2000, 3 pages.

Mossberg, Walter S., "New Ad Scanner Fails to Prove Itself Helpful or Convenient to Use", The Wall Street Journal, Oct. 12, 2000, 4 pages.

Spagat Elliot, "A Web Gadget Fizzles, Despite a Salesman's Dazzle: They Loved It in Boardrooms, but the CueCat Scanner Drew Yawns From Consumers", The Wall Street Journal, Jun. 27, 2001, 5 pages.

Website, http://www.wisesystemspr.com/scanner/pscgrocer.htm, PSC Grocer-eScan.TM. Home Shopping Solution, May 5, 2000.

Global Potato News, "United States: First Grower-to-Point-of-Sale Demonstration of RSS Bar Code Technology", Syngenta Limited, Oct. 29, 2001, 2 pages.

* cited by examiner

Main Module

Translation Module

Price Comparison Module

Product Review

Product Information

Transaction

METHOD AND SYSTEM FOR INTERACTIVELY PROVIDING PRODUCT RELATED INFORMATION ON DEMAND AND PROVIDING PERSONALIZED TRANSACTIONAL BENEFITS AT A POINT OF PURCHASE

CROSS REFERENCE OF PRIOR APPLICATIONS

This application is a Continuation-In-Part of International Patent Application Serial No. PCT/IB/02/05280, filed Dec. 11, 2002, now abandoned, which is a Continuation of U.S. patent application Ser. No. 10/023,364, filed Dec. 13, 2001, now U.S. Pat. No. 6,641,037, all of which are hereby incorporated by reference in their entirety.

TECHNICAL FIELD

This invention is related to an interactive method and system for providing product related information to a customer using information carried by the product itself, such as a UPC code, and enabling various transactions related to that product.

BACKGROUND

The use of computer networks has grown dramatically in recent years and the number and types of applications and services which are now available to a user has likewise increased substantially over the years. Generally, a computer network is a set of computers (or "hosts") which are able to communicate electronically. Each host is assigned a specific numeric address, which the network uses to route information to that particular host. To facilitate human use of the networks, each numeric address is often given its own unique alphanumeric code (or "mnemonic") so that the user may better and more easily remember the address. For example, the numeric address 200.87.482.32 may be assigned to the mnemonic "store.com".

At the present time, the largest and fastest growing network is commonly known as the "Internet", a world-wide "network of networks" which is formed by a great number of interconnected computers and computer networks. The Internet has a series of communication protocols which connect the collection of computer resources in a network fashion. Many of the sites available on the Internet can be accessed using popular standard protocols or formats, such as Hypertext Transport Protocol ("HTTP"). Each of these sites acts as a remote server and is designed to provide information to the user's computer in accordance with a particular format or protocol. Sites on the Internet that have been set up using HTTP protocol are commonly referred to as being "Web sites". If the user wishes to communicate with a particular, selected Web site, the user's computer must first be in communication with the Internet and must also be capable of communicating using HTTP protocol. Software in the user's computer which permits this to be accomplished is often called a "browser", for it allows the user to browse from one Web site to another site.

Users may also specify a Web site by manually typing in the site's location as a Uniform Resource Locator ("URL"). The URL is unique to a specific location and is used to specify the precise location of a particular resource. The URL has three fields, namely: <resource type> <domain name> <path>. The domain name is the alphanumeric network address on which a particular resource resides. The path is the specific directory and file on the host where a resource is stored. A typical URL is http://jjohnson.cc.umass.edu.html.

Often times, browsing through Web sites is fairly easy due to individual Web pages (HTML document) having a highlighted "link" or embedded URL specifying the Internet address of another Web site (another HTML document). To access this other Web site, the user simply "clicks on" or selects the highlighted URL with a pointing device, i.e., a computer mouse. However, if the user wishes to connect to a Web site that is not referenced in a HTML document, then the user has to manually input the URL of the Web site. This is not always an easy task and can be a very frustrating task as it requires the user to know the entire URL of the Web site. Often times, the particular URL may be fairly long and complex to remember.

Devices have been developed to assist an individual in storing URLs that are of interest to that particular individual. For example, it is known to use bar coded symbols which are encoded with a URL indicating the location of a particular Web site that is of interest. In U.S. Pat. No. 6,027,024 to Knowles, which is herein incorporated by reference in its entirety, an Internet scanning system is provided. The system includes a wireless bar code symbol reading system having a hand-supported laser scanning bar code symbol reading device for reading a bar code symbol. The programmed bar code symbol reader functions to read a bar code symbol that is encoded with the URL of a Web site which the user desires to access. The URL-encoded bar code symbol may be conveniently placed in all types of printed matter, including printed guides, directories or publications which digest, catalogue, organize or otherwise list WWW sites. Furthermore, the URL-encoded bar code symbol may be placed in advertising in magazines, newspapers, and the like so that a user, who is interested in obtaining more information on the particular product or service being advertised, may simply use the wireless bar code symbol reading system to scan the URL-encoded bar code symbol.

In the '024 patent, the Internet scanning system also includes a scanning integrated terminal which may be a part of an interactive web-based television system. The terminal (i.e., a computer or transportable computer) is connected to the Internet using known communication methods. During operation, the scanning device is used to read the URL-encoded bar code symbol printed on some type of matter in order to connect to the corresponding Web site thereof. Thus, this type of system eliminates the need for the user to remember a long and sometimes complex URL of a particular Web site or the like. However, such a system has limitations as the system has a fixed relationship between the URL code and the Web site that is linked to this particular URL code. This severely limits the type and amount of information available to the user. For example, the user is not able to select the type of information which he/she desires concerning the particular product or service identified by the URL code but rather the user is simply sent to a particular section of a Web site which is linked to the URL code. This may not be especially helpful to the user as often times the URL code is linked to a very general Web page that does not include the type of information the user would like to view. In addition, this type of device is merely a locator device which simply improves the process and ease of accessing a particular Web site. The device does not provide the user with other options, such as access to other Web sites that may be of interest, etc.

In addition, other types of computer communication systems have also been developed for giving users convenient access to information located on computer networks, such as the Internet. For example, in U.S. Pat. No. 5,978,773, which is herein incorporated by reference in its entirety, a system and method for using an ordinary article of commerce to access a remote computer are presented. As most consumers are aware, most products or other articles of commerce have an associated bar code or other indicia thereon which uniquely identifies the product. The indicia encodes (in human and/or machine readable form) a UPC or other identification number, which is associated with the article in accordance with an extrinsic standard. As most consumers realize, a majority of products contain a visible bar code displayed on the product itself, its packaging or some other component of the product. The use of bar codes is especially prevalent in the shopping arena where products are inventoried using bar codes and are purchases are made at a register by scanning the bar codes.

In the '773 patent, a computer database is provided that relates standard UPC codes to Internet URLs or network addresses. To access a network resource relating to a particular product, the user swipes a bar code reader across the product's UPC code. The database then retrieves the URL corresponding to the UPC product data. This location information is then used to access the desired resource on the network. It is often difficult to present URL data in bar code format because the resulting bar codes would be too long for practical use. By using existing UPC product information and then developing a database of network locations, the manufacturers do not need to list their addresses on the product or packaging itself, which many times has a limited area. The UPC code can be printed on removable stickers or detachable cards, thereby allowing the users to simply clip the UPC code for future reference.

While this system is useful in some applications, it has limitations that adversely impact the number and types of potential applications for the system. Once again, there is a fixed relationship between the UPC code and a Web site linked to that particular UPC code. In operation, the user scans the UPC code and a search of the database is done. If the UPC code matches one that is stored in the database, records are retrieved and displayed. For each record, a link associated with the URL is provided and when the user selects the link, browser software or the like loads the URL associated with the selected link to access the resource at the location specified by the particular URL. The association is based on selected criteria and many times, the selected criteria will be the existence of a Web resource sponsored by the manufacturer of the product identified by the UPC code. The association could also be based on the existence of a Web site that simply refers to or relates to the particular product. The database may also be incorporated with a database or search engine.

One of the disadvantages of this type of system is that the types of information which are accessible to the user are limited. The system primarily is designed to provide a link to informational resources that are associated with the product and more specifically, are associated with the UPC code. Thus, the information called up by the scanning of the UPC code may be much too general and entirely useless. For example, the scanning of a UPC code for a bottle of aspirin might lead to a general page for the manufacturer of the aspirin instead of a more specific page on the product itself. The printed URL address on the product may actually lead to a more comprehensive and useful page on the aspirin product itself. The user is thus not given specific options listing the types of information or services that are available to the user and therefore, the user may become frustrated and overwhelmed with general, useless information.

Similar systems, such as the one described in U.S. Pat. No. 6,012,102 to Schachar, which is herein incorporated by reference in its entirety, may be used to encode a resource address (Internet URL, E-mail address, or other similar network specifier) into a symbol. In operation, the symbol is scanned and application software accepts the data (i.e., URL) encoded in the symbol and interprets the data as a network resource address. After decoding the symbol, the application software is then able to generate a request to connect to the specified resource or E-mail address. A network session is then established to connect the user to the resource address. These system are fairly basic in that they are designed to permit the user to access the resource address in a simple and more efficient manner than if the user had to manually enter the resource address to provide a connection thereto. For the same reasons stated hereinbefore, these systems are likewise limited in that they have a fixed relationship between the encoded symbol and a resource address which is linked to the encoded symbol. While being useful in some applications, this type of system limits the types of information or services which can be provided to the user.

What is needed in the art and has heretofore not been available is an interactive system and method for providing product and related information to a customer using information carried by the product itself, such as the UPC code, where the customer is given a options menu listing the information and/or services available to the consumer. What is further needed in the art and has heretofore not been available is a system that is incorporated into a hand-held device, such as a cellular phone, and uses product information (e.g., UPC code) to provide pricing information from multiple sources. A benefit of such a system is that the customer is able to compare the prices of a number of merchants and individual merchants may bid to fulfill a customer's order at a lowest price, etc., based upon a request order being generated by the customer. What is further needed in the art and has heretofore not been available is a customer-accessible database incorporated into the interactive system and containing customer entries specified by the customer so that the customer may keep a log of products or services already used and any commentary with respect thereto. The present invention satisfies these and other needs.

SUMMARY

The present invention provides a system and method for interactively providing product and related information to a user based upon product identification information, such as a UPC code, and enabling the user to engage in various transactions related to the product. According to one aspect of the present invention, the system informs and educates the user about a particular product or service which the user is interested in and enables the user to efficiently purchase the product or service. Information which is provided to the user is not specifically limited to product information which has been provided by the manufacturer or a primary merchant but instead can come from multiple sources. These additional sources can be neutral or competing sources. For example, the product information may be in the form of product review studies and ratings obtained from a consumer products group which has tested and compared the product to other products within the same or similar class.

The system is connected to a network, such as a wireless network and/or the Internet, and accessed by a user access device through which the user can enter product identification information, e.g., the UPC code, forward the information to the system and preferably receive data communication in return. The user access device is a communications device which can establish a data connection to the network and in one embodiment, the user access device is a cellular phone having a device which can read the product identification information. When the product identification information is in the form of a bar code, such as a UPC or EAN international bar code, a bar code reader is incorporated into or attached to the user access device.

In operation of the system, the user simply uses the device to read the product identification information which is unique to that particular product and this information is communicated to the product information system through the network. The system has one or more modules which execute various functions which are available to the user. For example and according to one embodiment, the system has a main module which controls access to various function modules in communication therewith. Preferably, the system offers a number of functions to the user and in one embodiment, the system has modules which provide product information, facilitate transactions, provide product review information, provide price comparisons, and provide a personalized user database which the user may use to track personalized product information. Access to the various function modules can be provided according to a menu-based system, wherein the user is presented with the various options available and can select which functions to initiate. The user may also select a "find-all" function which will determine the type of information and functionality available to the user.

By using an established, preexisting code (i.e., the UPC code) which is disposed on the product itself or is printed on some type of matter, the database is able to link the user with a vast amount of information and related services. Unlike conventional systems which do no more than simply direct a user to a specific Web site that has been pre-associated with the product, the present system provides the user with a rich and dynamic source of information and functionality which can come from a vast number of sources. The user may access information provided directly by the manufacturer or related party as well as having access to information supplied by third parties, i.e., product reviews, ratings, etc. In addition, the user may also search for information on related products as the system preferably contains a product classification for each product identification.

Advantageously, the present invention provides the user with the ability to easily and efficiently obtain comparative pricing information and be able purchase the particular product that has been identified and read by the user access device. One of the functions the user may choose on the menu is a price comparison function. After the product identification information has been read and the price comparison function is selected, a pricing database is accessed. This functionality is configured so that various price quotes are gathered from various vendors for one or more products specified by the user. For example, various on-line merchants may be queried and price quotes obtained. The various price quotes and related purchase conditions or other price-related information are then preferably formatted and transmitted to the user.

The system also include a transaction function which facilitates the purchase of various products. Any number of techniques may be used to enable purchase of products. For example, the user may be provided with links to one or more on-line merchants or suppliers of the product and by accessing those links, the user may purchase the product. However, most products are available from more than one merchant so the system is designed to coordinate a bidding process wherein various merchants bid to fulfill a user's purchase request.

In another aspect of the present invention, the system permits the user to add and update product information to the information stored on the database. For example, if the product identification information is not found in the database, the user may input this information into the database. The system will preferably indicate using an icon or the like that the information is user-inputted and has not been verified. The user may also add personalized information when accessing other information or using the functionality of the system. For example, the user may add their own review and commentary concerning a particular product or service.

In yet another aspect of the present invention, the system contains a customer database which is a personalized database. The user may add selected products to their personalized database by entering the product's identification information. This may be easily done by simply reading the product identification information using the reader and then selecting from the user database function from the options menu. The user then instructs the system to store the product identification information in the personalized database and the user may also add commentary concerning the product or service. It is difficult sometimes to remember if purchase of a particular product would result in a duplicate transaction. For example, people that have vast numbers of cassettes, books, video tapes, etc., may easily forget the extent of such collection. By maintaining a personalized product information database, the user will be alerted in the situation where the user has read a product that is already in the database.

The system also permits batching of searches, wherein the user scans plural objects and instructs the system to gather information about all the products to permit comparative analysis and shopping. For example, the user may scan in several stereo system models and the present system will compile product information, reviews, other product information and will also retrieve the best purchase price for each stereo system.

In yet another aspect, a method of providing personalized transactional benefits at a point of purchase over a network based on personalized identification information provided by a consumer and stored on at least one server (first server) is provided and in alternative embodiments, the information is stored on more than one server that are all communicatively connected to one another. The at least one server also has stored thereat a plurality of product identification numbers which are used to identify articles of commerce, where each article of commerce bears an indicia on which one product identification number is encoded. Once again, it will be appreciated that the product identification numbers can be stored on more than one server and using software and standard addressing protocol, the computer will be directed to the server on which the selected product identification is stored. The method includes the steps of (a) providing a code symbol reader, operably connected to the first server of the network, for scanning the indicia on the product. The indicia is associated with the product identification number and the code symbol reader includes a personalized identifier to identify the consumer; (b) reading at least a portion of the indicia on the article of commerce using the code symbol reader; (c) retrieving from the one or more servers the product identification number associated with the indicia on the article of commerce; (d) processing the at least one personalized identifier of the consumer and retrieving from the one or more servers the personalized identification information provided by the consumer; (e) displaying at least one of pricing information, purchasing options, and product information for the article of commerce; and (f) offering personalized transactional benefits for the purchase of the article of commerce based on the personalized identification information provided by the consumer and stored on the one or more servers.

In one embodiment, the personalized identification information includes a listing of affinity programs that the consumer is enrolled in and includes a listing of associated identification numbers for each program. The personalized identification information includes a database of past purchases of the consumer. The system is configured so that offering personalized transactional benefits involves, in one embodiment, the steps of (a) determining whether the consumer is entitled to a discount towards the purchase of the product based on membership in one or more affinity programs and (b) if the consumer belongs to a qualifying program, then the consumer is offered, at the code symbol reader location, certain benefits, such as reduced purchase price, free shipping and handling, future coupons, etc.

The present invention thus provides a comprehensive interactive method and system for providing product information to a user and also enable various transactions related to the product to be made.

In yet another embodiment, the code symbol reader is actually part of a mobile device that includes an inbuilt or utilizes an attached camera to capture the product identification codes. After the image is captured by the camera of the mobile device, the processing of the image into a bar code or other product identifier can be done either locally or remotely. This then triggers the actions selected by the user (reviews, comparative pricing, product information, etc. Thus, it will be appreciated that the mobile device, such as a cellular phone, can be used as a the bar code reader device as opposed to a traditional bar code reader that is placed in close proximate relation to the bar code itself. The camera is the means by which indicia, including but not limited to a bar code, logo, or other visual product identifiers, is captured and then processed for determining the identity of the product and associating a product identifier number thereto, thereby permitting the consumer to perform the operations described hereinbefore.

BRIEF DESCRIPTION OF THE DRAWINGS

The foregoing and other features of the present invention will be more readily apparent from the following detailed description and drawings of illustrative embodiments of the invention in which.

DETAILED DESCRIPTION OF THE PREFERRED EMBODIMENTS

Figure 1:
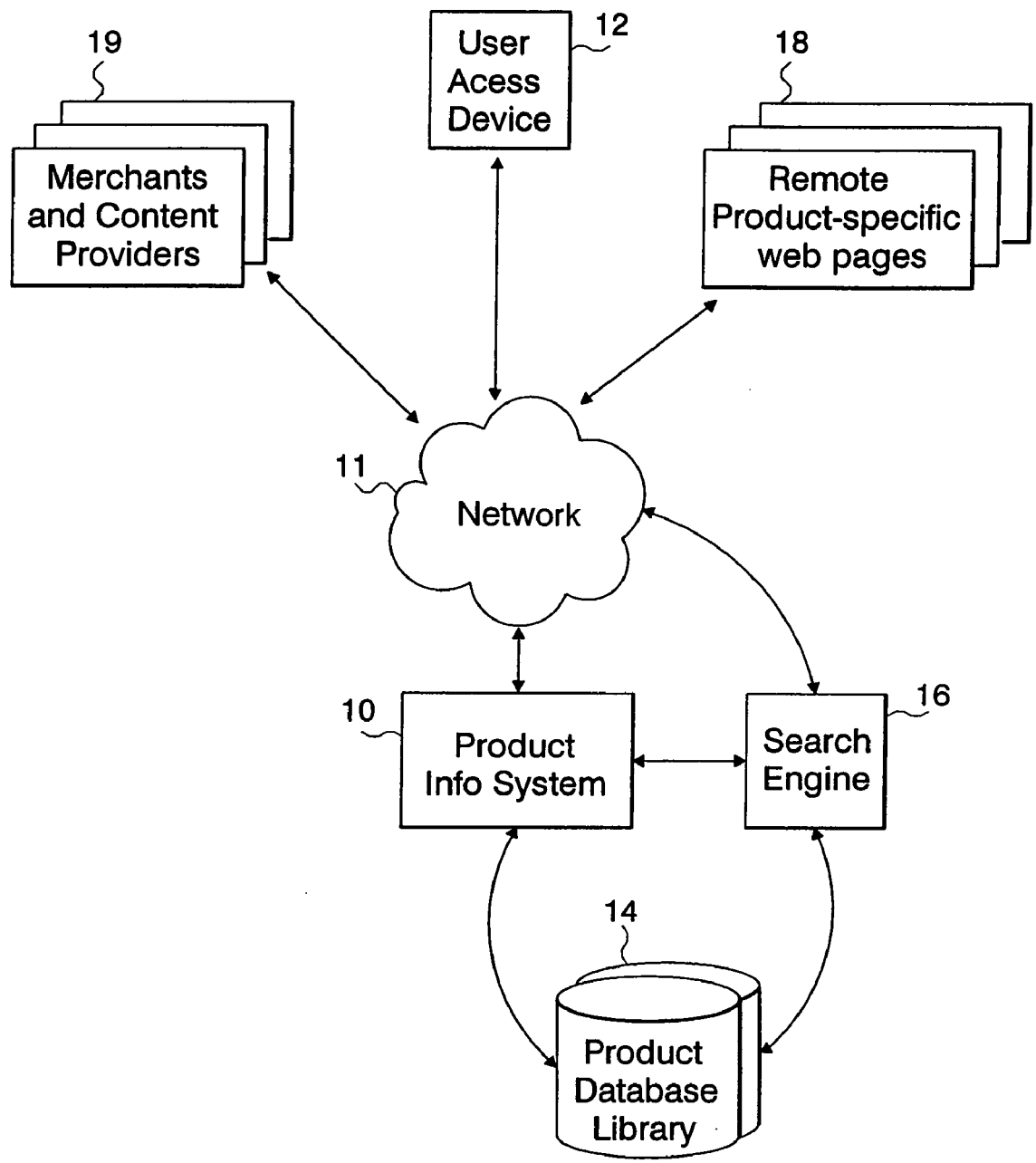
FIG. 1 is a high-level block diagram of a system for interactively providing product information to a user.

Turning to FIG. 1, there is shown a high-level block diagram of a system 10 for interactively providing product information to a user. The system is connected to a network 11, such as a wireless network and/or the Internet, and accessed by a user access device 12 through which the user can enter product identification information, forward that information to the system 10, and preferably receive data communication in return. Briefly, upon receiving a product ID entered by a user, the product information system 10 accesses an appropriate database 14 and returns information relevant to the identified product to the access device 12. The returned information can include product information and reviews, comparative pricing information and availability, as well as generated product-specific web pages or remotely located pages 18. In addition, various other remotely accessed merchants and content providers 19 can be accessed as discussed in more detail below.

A search engine 16 can be utilized to extract the appropriate information from the database library 14 and possibly locate other data resources accessible through the network 11, such as product-specific web pages. Although some types of information can be predefined, preferably a search engine 16 is also utilized to locate relevant information stored within the product database library and possibly on Internet web pages which are maintained by third parties. The system 10 can also enable various transactions related to the product, such as a direct purchase of the product by the user or the submission of an order to an electronic bidding system wherein one or both of the user and merchants bid to fulfill the order. According to a further aspect of the invention, the system 10 can also maintain a secure database of user-identified products and associated information, which database can be accessed by the user as needed or made available to the system 10 or third parties for various purposes. These aspects of the invention will be discussed in more detail below.

The user access device 12 comprises a communication device, such as a computer, cellular telephone, wireless-enabled portable data device, etc., which can establish a data connection to the network. Preferably, the network connection comprises an Internet connection. However, other network connections can also be used. In addition, particularly in the case of wireless devices, an intermediate wireless communication network can be interposed between the communication device and the Internet. Alternatively, the system 10 can be configured as a direct-access dial-up device which is reachable through the communications network without requiring additional data paths through the Internet.

Various types of product identification can be used, including manufacturing companies, product codes, and the like. In a preferred embodiment, the product identification comprises a bar code, such as a UPC or an EAN international bar code, and the user access device 12 comprises a bar code reader and additional software and/or hardware to allow the user to scan in one or more bar codes and transmit these codes to the product information system 10. The codes can be transmitted interactively or stored within the user access device 12 and transmitted at a later period of time through a direct network connection or via an intermediary device to which the scanned codes are uploaded. The codes can be transposed onto URLs or other location metaphors that the device is aware of, including preloaded or cached information sets. In a most preferred embodiment, the user access device 12 comprises an Internet-enabled cellular telephone or personal digital assistant having an attached or embedded bar code scanner which enables a user to scan the bar code on a product of interest and immediately transmit the bar code to the system 10. Other types of bar-code scanning devices and network access equipment can also be used and the specific form of the input device is not critical to the operation of the product information system.

Figure 2:
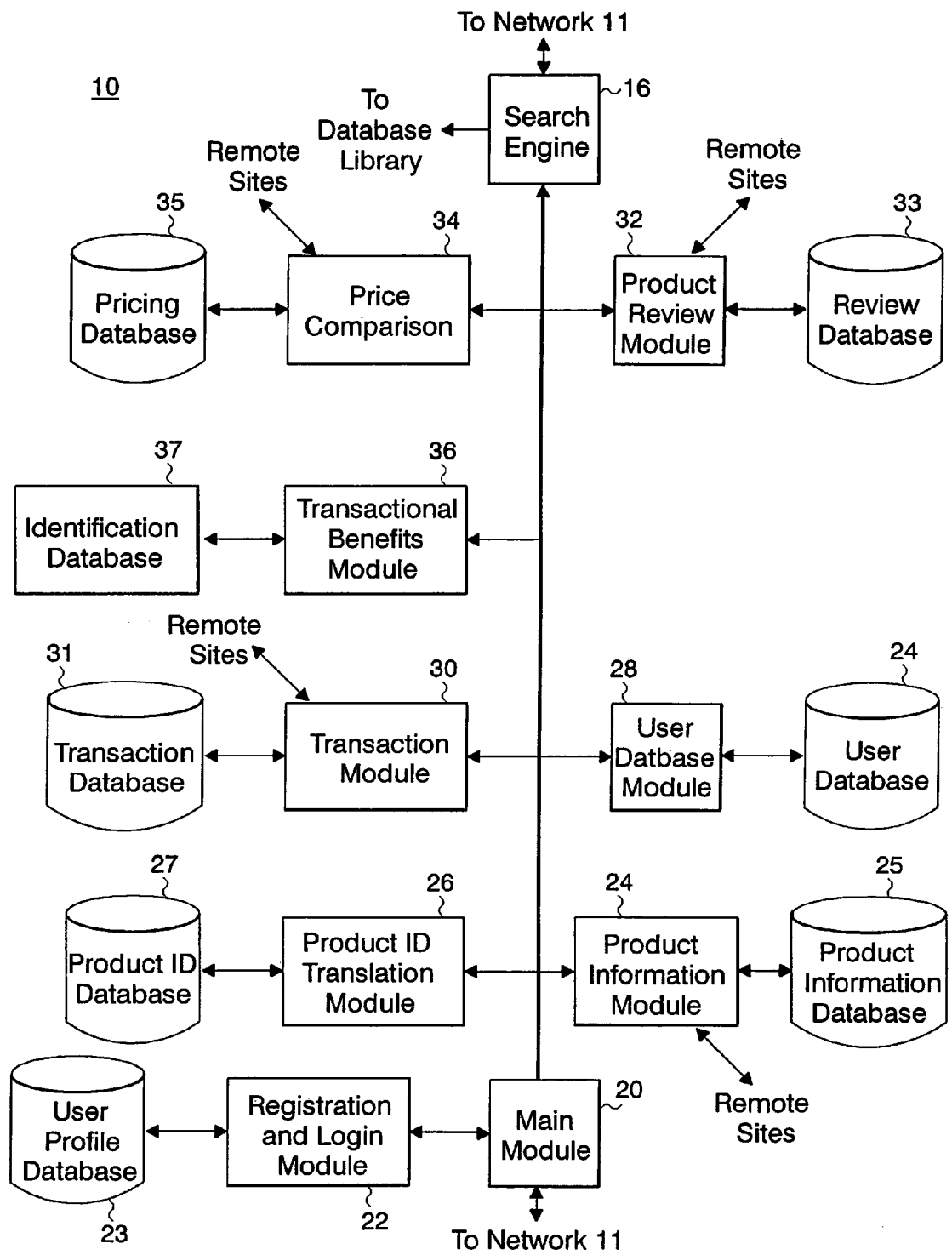
FIG. 2 is a module-level diagram of one embodiment of the product information system.

Turning to FIG. 2, there is shown a module-level diagram of one embodiment of the product information system 10 wherein each major function is represented as a separate module. As will be recognized by those of skill in the art, the programming architecture of system 10 need not be organized in this manner and various functions can be combined into one or more multi-function modules. In addition, it is not required that all of the major functions be implemented. Instead, various combinations of one or more functions can be implemented in various embodiments as appropriate for the particular circumstances at issue.

Operation of system 10 is coordinated by a main module 20 which communicates through the network 11 with a user to receive product identification information, menu selections, and the like, and to provide information in response. The primary purpose of the main module 20 is to coordinate access to the various function modules, such as a registration and login module 22, a product ID translation 26, a product information module 24, a transaction module 30, a user database module, 28, a price comparison module 34, and a product review module 32, each of which is discussed in detail below. Access to the various function modules can be provided according to a menu-based system wherein a user is presented with the various options available and can select which functions to initiate.

In addition to permitting a user to access given functions discretely, a "find-all" function can be implemented in the main module 20, wherein the module will access or poll the various other function modules to determine what types of information and functionality is available for the specifically identified product, either within the system itself or via various outside web sites, and then make all appropriate information and/or functionality available to the user. The information gathered can be limited to that directly available to the system. In most circumstances, however, at least limited access can be made to external resources from which additional information can be gathered, such as comparative pricing and availability information and third party product reviews or commentary.

Advantageously, this option, in effect, allows a user to provide a product identification and receive in return access to all information and functionality which is available to the system and which is relevant to the identified product. Unlike conventional systems which do no more than simply direct a user to a specific web site that has been pre-associated with a given product, typically by the product's manufacturer, the present system provides the user with a rich and dynamic source of product information and functionality which can come from a wide array of sources and which can both educate the user about the product at issue and provide an efficient access to various transactions relating to the object.

The gathered information can be returned directly to the user. Preferably, however, once the system determines what types of information and services are available, the main module presents the user with a menu or table, e.g., via a dynamically generated or updated web page, that organizes the results and permits the user to select which specific information to retrieve or function to access. If information or functionality is not available for the identified product, the associated menu option can be hidden or not displayed or another indication provided to inform the user that the option is not presently suitable for the specified product. For example, a user may be interested in viewing product reviews for a given product. In accordance with the "find-all" functionality, the system will automatically search the available product reviews to determine if any reviews are available and present those reviews to the user or indicate that reviews have been found and give the user the option to view the review. Another further advantage of the present invention is that this type of arrangement ensures that when a user selects one of the presented options, such as viewing product reviews, the option will be viable. This is particularly useful for implementations where users are charged for use of the system 10 according to the options they select since user's will not be required to select an option, possibly for a fee, only to determine that the function is not useful for the product a issue.

Figure 3:
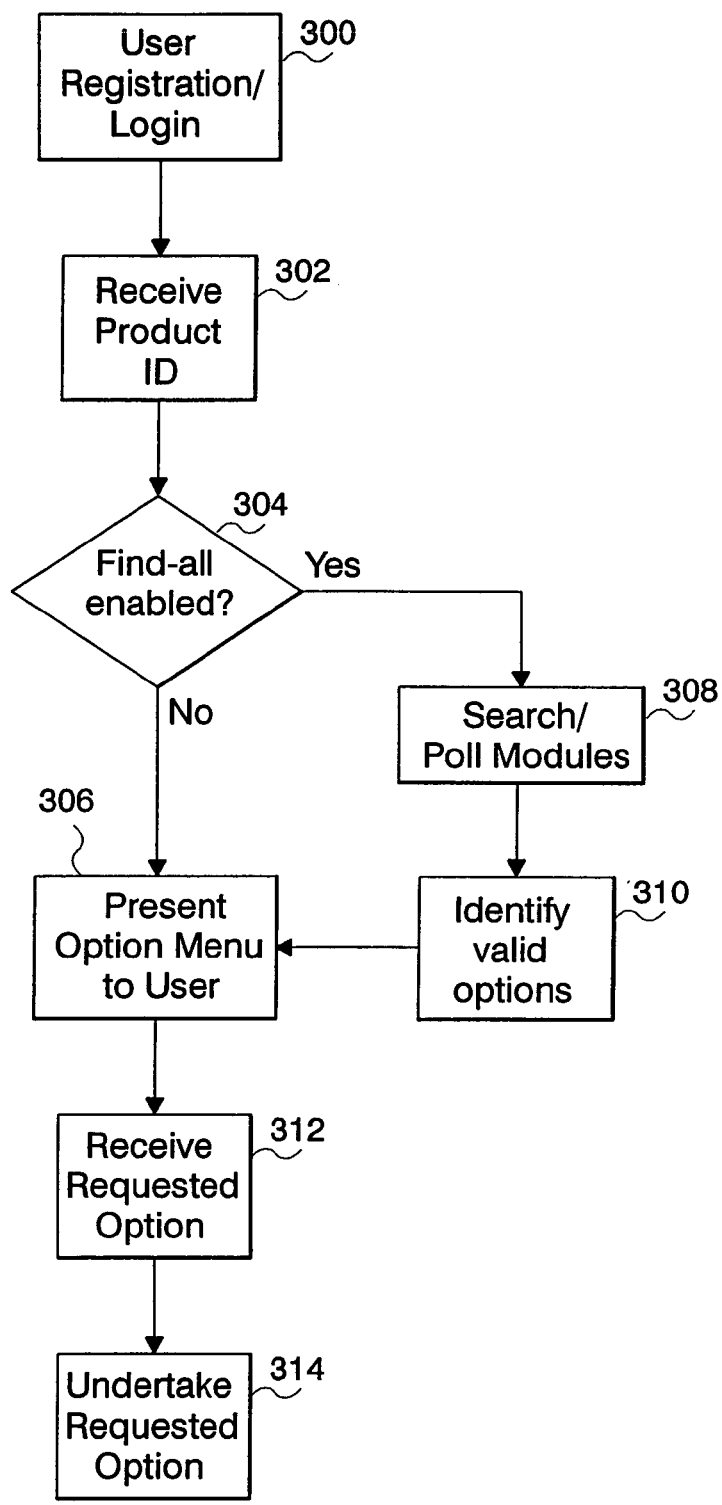
FIG. 3 is a flowchart summarizing the general operation of the main program module.

The general operation of the main program module 20 is summarized in the flowchart of FIG. 3. Initially, a user registration and/or login procedure is performed (step 300). The customer is then permitted to transmit product identification information, which information could be pre-stored by the user for transmission or scanned-in or entered and immediately transmitted to the system 10. When product information is received (step 302), an option menu is presented to the user (step 306). If the main module 20 is configured to implement the find-all option, the various function modules are polled and appropriate databases and/or web-sites are searched to identify valid options and, as discussed above, the menu is adjusted accordingly. (Steps 304, 308, 310). Upon receipt of a selected option by the user (step 312), the requested action is undertaken (step 314).

The specific function modules detailed in FIG. 2 will be discussed below.

The registration and login-module 22 implements the desired system security and access routines. Although a log-in routine is not required, it is useful for many reasons, including limiting access to some or all services to paying members, to permit the system to tailor its operation for specific users or maintain a history usage, etc. Various types of registration and login routines and options are well known to those of skill in the art and are therefore not specifically discussed herein. In a specific embodiment, the user access device 12 comprises a cellular telephone or other wireless device and the device ID or assigned telephone number is used as the user ID. The identification of a specific user may be through the identity of the device, SIM card (or other removable media), PIN and other indirected identities such as certificates or other identity tokens from associated and recognized systems. Preferably, the registration and login module 22 includes a user profile database 23 for storing user registration and login information, such as a user name and ID, specified preferences, biographical and geographical data and the like. The user profile can also include a designated e-mail or wireless messaging address to, e.g., permit notifications and requested information to be forwarded to the user when the user is not connected to the system or is connected through a device which is not well suited for receiving and processing large quantities of information.

The product ID translation module 26 is used to identify and categorize products identified by designated product identification information. The translation module 26 serves as a front end to a product ID database 27 which contains information to associate product identifications, such as a UPC, with various data elements useful for providing information about the product and for determining what types of information and resources would likely be available. Suitable data elements include a general description of the product, its manufacturer, a product classification (such as "personal electronics", "entertainment media", "home appliance", "food", etc.) as well as various sub-classifications appropriate for the various categories, an internal reference number, and possibly even tracking information to record the number of times a specific item has been referenced. Additional data elements can also be provided as desired, such as cross-references to related or competing products.

Figure 4:
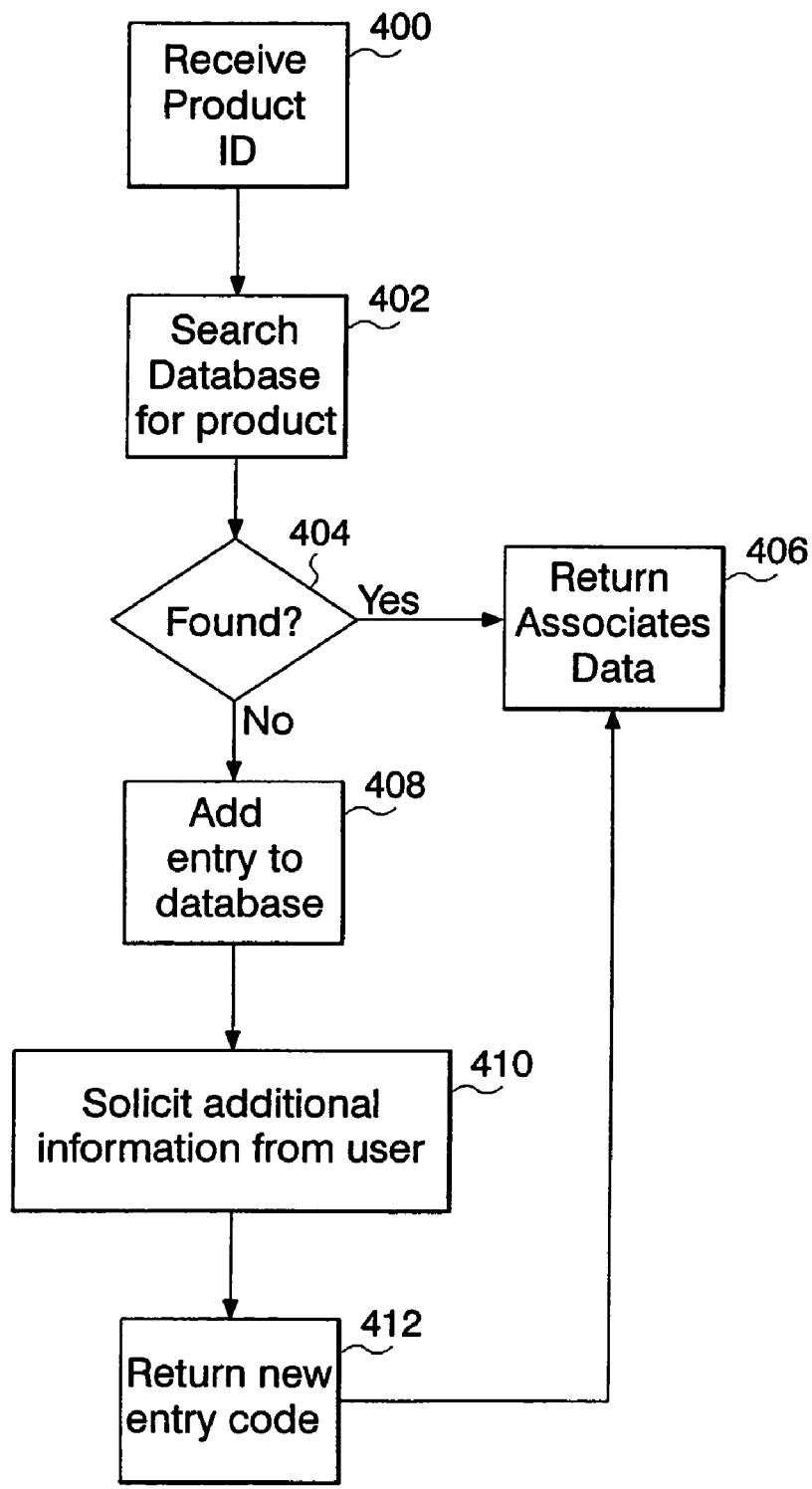
FIG. 4 is a flowchart summarizing the general operation of the translation module.

As summarized in the flowchart of FIG. 4, the translation module 26 can be configured to receive a product ID (step 400), search the product ID database 27 for that product (step 402) and, if an entry is found, return the associated information. (Steps 400–406). If the entry is not found, an appropriate error code can be returned. Alternatively, as a way of continually updating the database, when a product ID is not found, a new record can be created in the product ID database 27 for the specified product (step 408) and the user asked to provide additional information about the product, which information is subsequently added to the database (step 410). Rewards or program credits can be provided to such users to encourage entry of the additional data. Preferably, a return code is provided (step 412) which indicates that the product is new to the system and that further information may be required. In one embodiment, user-provided data is flagged as unverified until reviewed or confirmed to ensure its accuracy. It will be appreciated that data solicitation could alternatively be implemented as part of the Main module 20 or the new item simply tagged as being unknown and addition of the entry to the database with the appropriate information (perhaps provided by the user) subsequently managed by a system operator.

Advantageously, this mechanism to quickly and easily identify a product, both by a specific name, and also by various classifications, greatly simplifies the task of determining which resources are appropriate to search for information on the specific product. For example, various on-line resources may be available which provide pricing information or product reviews. However, these resources generally focus on only one or a few specific genres of products. By knowing the classification of the product, intelligent decisions can be made about which of those resources, if any, would be the most likely to contain the desired information.

Figure 5:
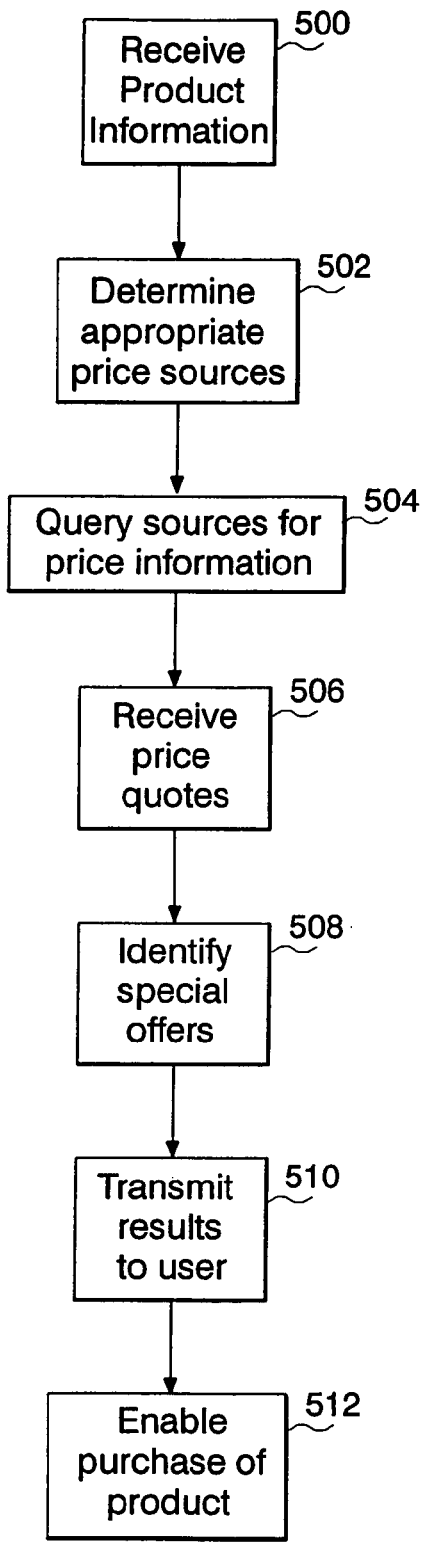
FIG. 5 is a flowchart summarizing the general operation of the price comparison module.

The price comparison module 34, the operation of which is summarized in the flowchart of FIG. 5, is configured to gather and return price quotes from various vendors for one or more specified products. Initially, the module receives the product information for the product at issue. (Step 500). This information can include some or all of the data retrieved by the translation module 26, such as the product classifications. If only the product ID is provided, the price comparison module 34 can be configured to query the translation module 26 to retrieve additional information.

A pricing database 35 is then accessed to identify appropriate sources to retrieve price information in accordance with the product classification at issue. (Step 502) In general, the product price sources will be various on-line merchants of the relevant types of products. Other sources may also be used, such as third-party systems which are specifically designed to provide price comparisons of various specific products, such as books and electronics. It will be recognized that if the system 10 is configured only to operate for a particular class of goods, such as, e.g., wines or electronics, the same sources may be appropriate for all specific products and thus the identification process may be unnecessary.

After identifying the appropriate pricing sources, those sources are then queried (step 504) and the price quotes are received (step 506). Additional information regarding special offers can also be received or determined (step 508). Such information can include limitations placed on the quoted price or limited time offers. The information can be provided by the queried vender. In addition, the price comparison module 34 can be further configured to promote product from specific vendors, e.g., by offering discounts.

The various price quotes are then formatted as needed and then transmitted to the user along with an identification of the source of the quote and perhaps an indication of the availability of the product (step 510). In addition to providing the price quotes, sufficient additional information is provided to the user to allow them to immediately submit a purchase request for the product from an identified merchant having an acceptable price. (Step 512). Such a purchase can be enabled by providing an Internet link to the merchant or by various other techniques wherein various aspects of the transaction are managed, at least in part, by the system 10. Although such purchasing functionality can be included within the price comparison module 34, preferably a centralized transaction module 30 is provided to manage purchase requests which originate from various parts of the system 10. The transaction module 30 will be discussed in more detail below.

The product review module 32 provides the user with access to various product reviews. The reviews can be provided by prior users of the system. As part of the review process, the user can rate or otherwise evaluate the purchases themselves and/or the quality of the products. For example, such a rating system can be based on 5 stars with 5 stars indicating an excellent product or purchasing experience. The user can rate not only the product but also the establishment or on-line site where the purchase was conducted. For example, the user can rate whether it was difficult to make the purchase and whether either the people were helpful and knowledgeable or whether the on-line site was user-friendly. Additional reviews can be retrieved from external repositories or specific content providers. In particular, various product reviews can be maintained within a review database 33 which is available to the system 10. The review database can comprise commercial or professional reviews and can also include comments or reviews submitted by users of the system. Various techniques can be used to organize the reviews stored on the system as will be recognized by those of skill in the art. As summarized by the flow chart of FIG. 6, when the review module receives the product information (step 600), the review database 33 is searched to locate reviews related to the specified product (step 602).

The review database can also identify other content providers, such as external web-sites, to query for reviews. (Step 604). Preferably, the content providers are indexed according to the types of products which they review, such as music or books. Using this information, the product review module 32 can easily select the proper providers to query, if any, in accordance with the product classification provided by the translation module 26. Although many content providers can be freely accessed, particularly those which are also product merchants, other content providers may require a subscription access. There are various ways in which access to these sites can be provided. In one embodiment, the service 10 can be granted access by the content provider, e.g., on a per-use or unlimited basis. In a separate embodiment, the system can be configured to access content providers to which the user is a member. To enable this feature, during the registration process, the user can be asked to identify such content providers and provide their user ID and password. This information can then be securely stored as part of the user profile. To encourage subscriptions to such content providers, the user can be invited to subscribe to the external providers during the system registration process, and perhaps offered various incentives or discounts. In addition, when reviews are located, they can be presented by icons indicating the source of the review, both to enable the user to gauge the review's credibility and possibly enable the user to subscribe to the source of the review, if appropriate.

If, after searching and/or querying the various sources of product reviews, no reviews have been found, an additional, more general search for information can be initiated using one or more Internet search engines. (Steps 606, 612). Because the types of information retrieved from such a general search can vary widely in both quality and relevance, the user may first be asked whether to conduct such a search. The selection can be made on a case-by-case basis or specified as a system option in the user's profile. In addition, the system can broaden the review search by looking for reviews of products which are similar to the product at issue After all of the located reviews have been located and retrieved, the reviews are formatted and provided to the user (steps 608, 610). Because various types of user access devices 12 with different data display and storage capabilities can be used to access the system 10, the retrieved data is preferably formatted and possibly condensed in accordance with the device capabilities. In addition, the user can specify that the all of the retrieved data be forwarded to a separate location, such as a specified e-mail address or fax number, which address or number can be predefined in the user profile.

In addition to product reviews, additional information can also be provided to the user by the product review module 32. In particular, the reviews can include advertisements regarding the product at issue or goods or services related to the product. If no reviews are located, an "advertorial" for the product can be supplied instead (along with appropriate caveats regarding the source of the information). In addition, functionality can be provided to enable the user to purchase the product at interest or access other system modules, such as the price comparison module 34 and the transaction module 30. Value chain information [what is this?] of a designated retailer of the product or another value chain participant can further be provided.

Figure 7:
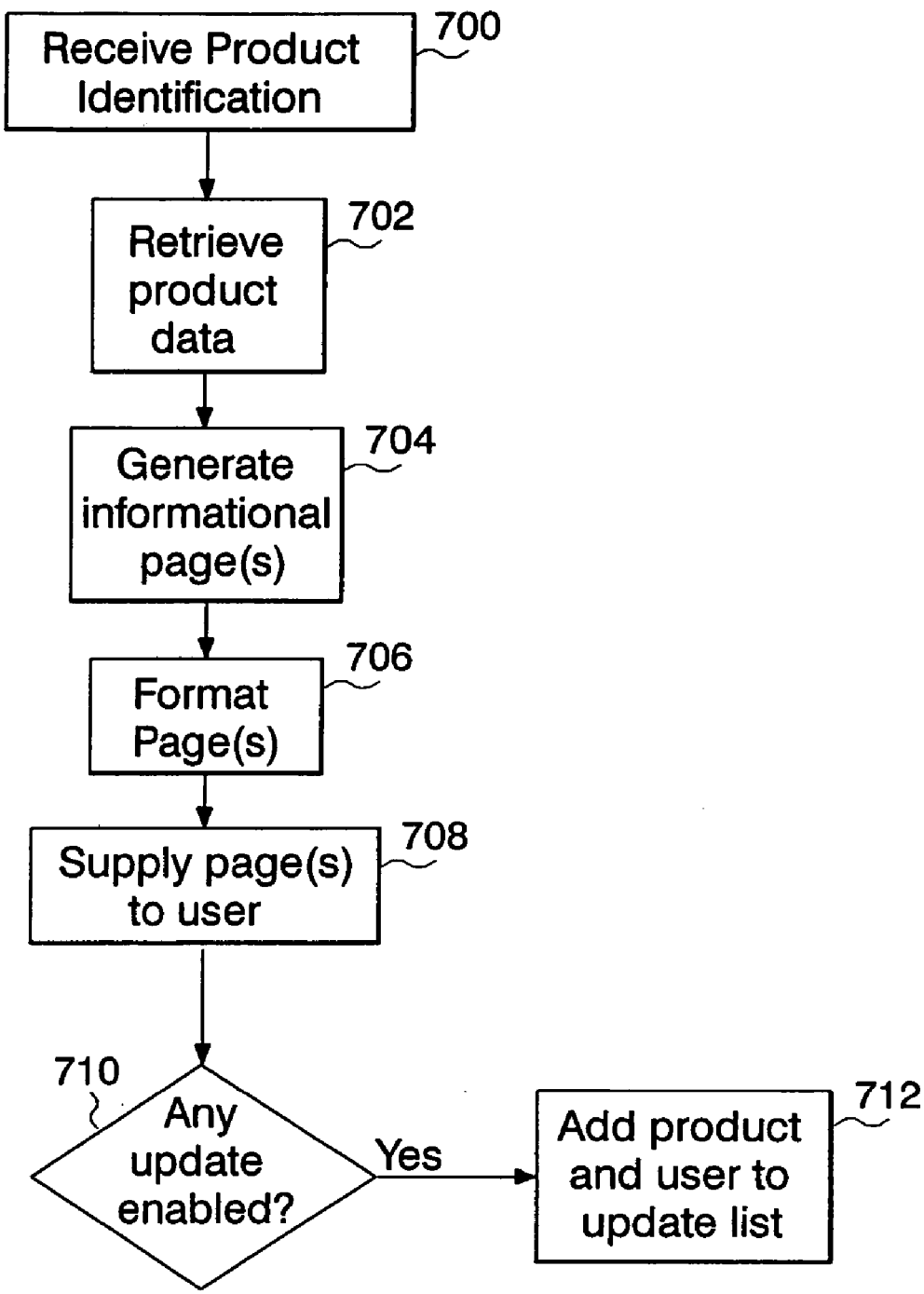
FIG. 7 is a flowchart summarizing the general operation of the product information module.

In addition to receiving pricing information and product reviews, a user may be interested in receiving more general information about a product. A product information module 24 is used as a gateway to supply product information pages to the user. Product information can be stored locally in a product information database 25 or the database can be used to identify an external source of product information. As illustrated in the summary flowchart of FIG. 7, after the product ID is received (step 700) the available product data is retrieved (step 702). The product data can include a description or general product information, technical specifications, user manuals, etc. The information is collated into one or more product information pages (such as an Internet web page) which is subsequently formatted in a manner suitable for the user's access device and then provided to the user (steps 704–708). The product information page(s) can be generated dynamically or be predefined (static) pages. Preferably, data for at least the most popular products is retained locally and the specific pages, in the proper format, generated as needed. As with the product reviews, the quantity of information provided the user may be limited and the entire data forwarded to a separate designated e-mail address. Alternatively, the product information pages can be stored within the system 10 and the user provided with a specific pointer, such as a URL, to the designated page. A similar mechanism can be used to provide other data to the user, such as reviews and pricing comparisons, to thereby permit the user to retrieve the requested and gathered information at a later time and from a different device. Links to appropriate merchant sites or product suppliers can also be supplied to enable the user to gather additional information if desired. Links and/or functionality can further be provided to enable the user to easily submit a request to purchase the product.

In addition to providing the requested product data to the user, the user can request to receive notification when the data is product data is updated, revised or replaced. If this option is requested, the user's ID and the product identification can be added to a notification list along with, for example, a timestamp indicating when the original data was gathered for the user. (Steps 710, 712). On a periodic basis, the system 10 can subsequently reexecute the search and determine if any changes to the data have occurred and, if so, inform the user of the same by, e.g., e-mail. Various techniques for monitoring the status of data files and detecting updates or changes can be used and are known to those of skill in the art.

Apart from providing product-related information to users, another aspect of the system is to facilitate the purchase of various products. Various techniques can be used to enable purchase of the products. In a simple embodiment, the user is provided with links to one or more on-line merchants or suppliers of the product at issue and, by following those links, the user can purchase the product using the merchant's on-line facilities. Often, however, several merchants are available which supply the same product. According to a further aspect of the invention, a transaction module 30 can be provided to coordinate a bidding process wherein various merchants bid to fulfill a user's purchase request on the best terms. Since a number of different bidding services can be available, each of which concentrates on specific genres of products, a transaction database 31 can be provided to specify appropriate bidding sites (and specific merchant and supplier sites for non-bidding purchases) in accordance with the type of product at issue.

Figure 8:
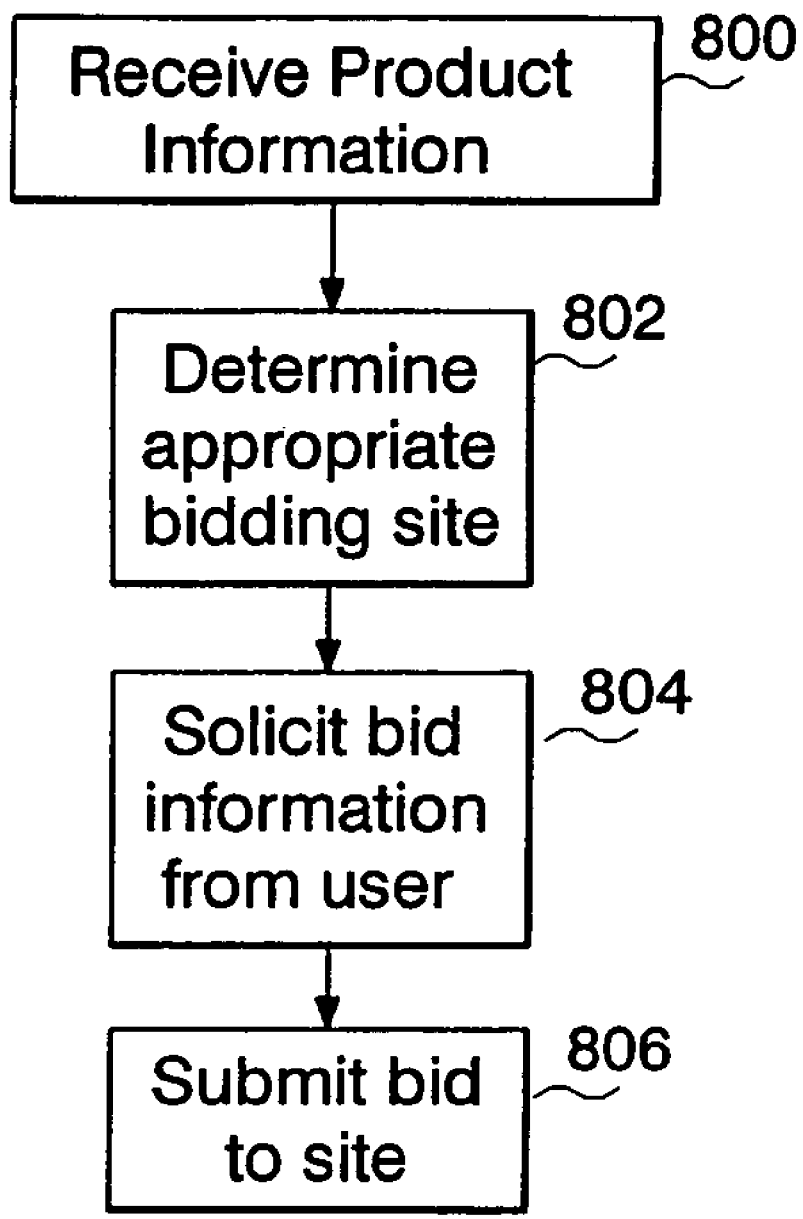
FIG. 8 is a flowchart summarizing the general operation of the transaction module.

As summarized in the flowchart of FIG. 8, after the transaction module 30 receives the product information provided by the user (step 800), it determines the appropriate bidding site for that product, e.g., with reference to data stored in the transaction database 31. (Step 802). Although the user can then be forwarded directly to the bidding site, preferably, appropriate bidding information is solicited from the user (step 804). The specific information required and the proper format for a specific bidding site can be specified in the transaction database 31. Generally, such information includes one or more of the product ID, the quantity to be purchased, whether delivery of the product is needed or if the user can pick the product up at a designated location, the location of the user, the distance the user is willing to travel to pick up the product, a maximum price, a time period, etc. Once the bidding details are provided by the user, they are formatted as required and then submitted to the bidding site (step 806).

Thereafter, the remainder of the bidding and purchase process preferably is managed by the bidding site. In one scenario, once the bid has been submitted, it is aggregated with requests for bids from other users and broken down by product type, user location, etc. Product suppliers access the bidding site and bid to on aggregated lots of the product. The bid site then forwards the offer to the customer (user) and the customer can accept or decline the offer. If accepted, the bid site confirms with the supplier that the bid is valid and than passes any additional customer information needed by the supplier. Billing for the product can either be directly through the bidding site, through the supplier, or through an enabler (such as a telephone bill). Settlement of the bill is through standard payment options.

According to a further aspect of the invention, the system 10 can be configured to permit the user to create an on-line database of products which they own. Through use of this database, the user and system can easily determine which products they have when the user is shopping to avoid accidentally purchasing the same product again, such as a book, or to enable re-purchase of a consumable item, such as a wine. Such functionality can be built in to the main module 20. Preferably, a separate user database module 28 is provided which accesses a user database 29 and secures the data so that only the owning user has the right to authorize access to it.

Such a database can also be used to store an on-going list of products of interest, e.g., to enable comparative shopping. In practice, the user would scan or otherwise enter data regarding products of interest and the products would be added to the designated user database. Rather than gathering information about each product as it is entered, the system 10 can be instructed instead to operate in a batch-type environment wherein the user enters all of the products of interest and then the system 10 gathers the requested types of information about each product in the specified database. The user's database can include information about any range of products and can be accessed using various filters to limit the information displayed or used at any given time. Users can also be permitted to add commentary regarding specific items. In addition, the user can select to have an anonomized version of some or all of the database made available to the system and possibly various merchants to permit data about the products to be gathered and to determine pricing and availability information.

Thus, for example, at a wine tasting, the user can scan in information about each wine they like, enter commentary, and store the entry in the on-line database. After all the wines have been entered, the user can instruct the system 10 to access the database and gather information about each wine. Subsequently, the user will receive any reviews about each of the wines which are available, price quotes from various wine vendors, information about wine, its vintage, the vineyard, etc. The gathered information can be automatically transmitted to the user when available or temporarily stored for later retrieval. In a specific embodiment, when all of the available and requested information has been retrieved, it is formatted and stored as a customized web page and the specific URL of that page is transmitted to the user to both signal that the data is available for retrieval and to provide access to the data. After reviewing the data, the user can easily place orders for those specific wines of interest which meet the user's purchase criteria.

Figure 9:
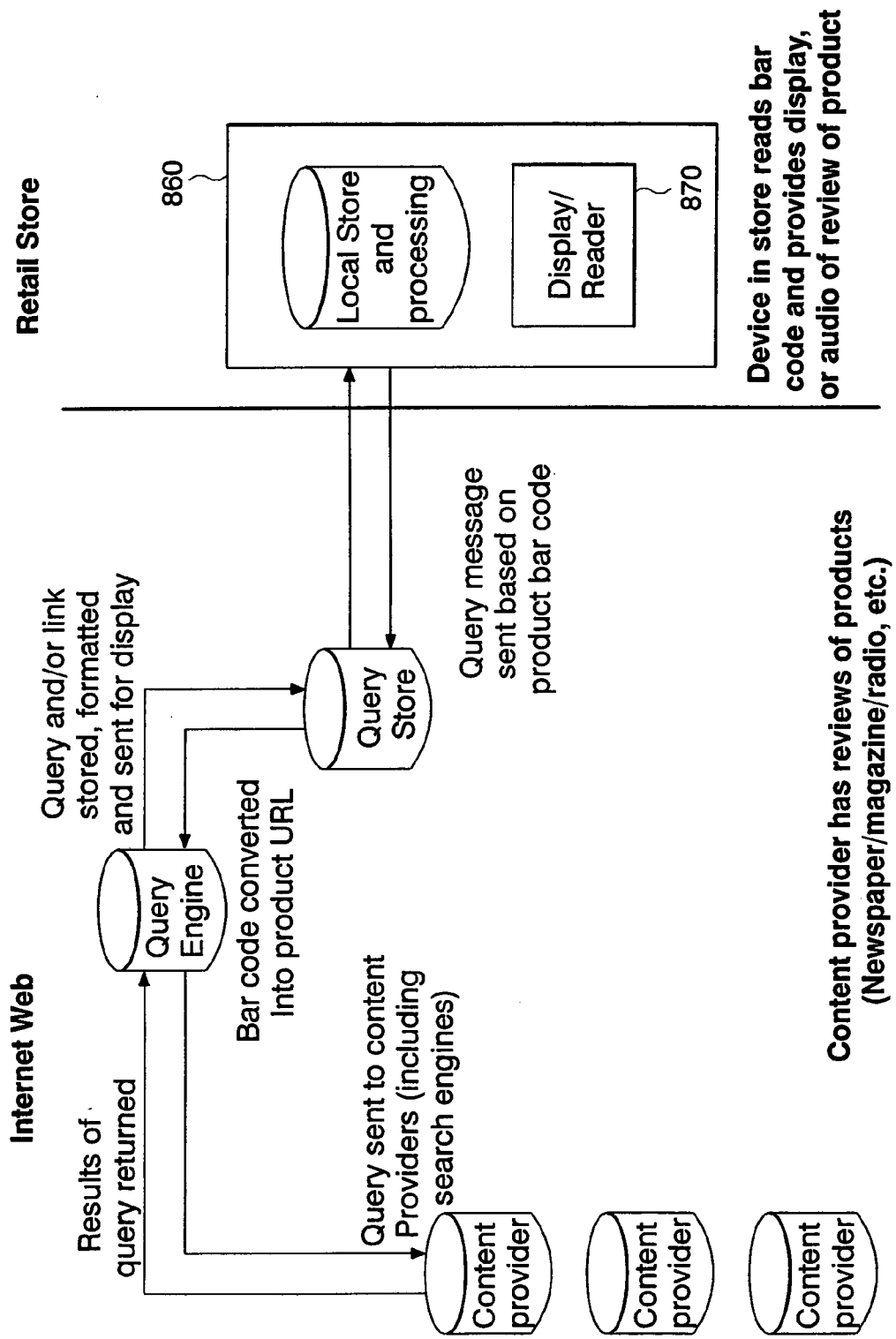
FIGS. 9 and 10 are high-level block diagrams illustrating the product information system configured for use in an informational kiosk.
Figure 10:
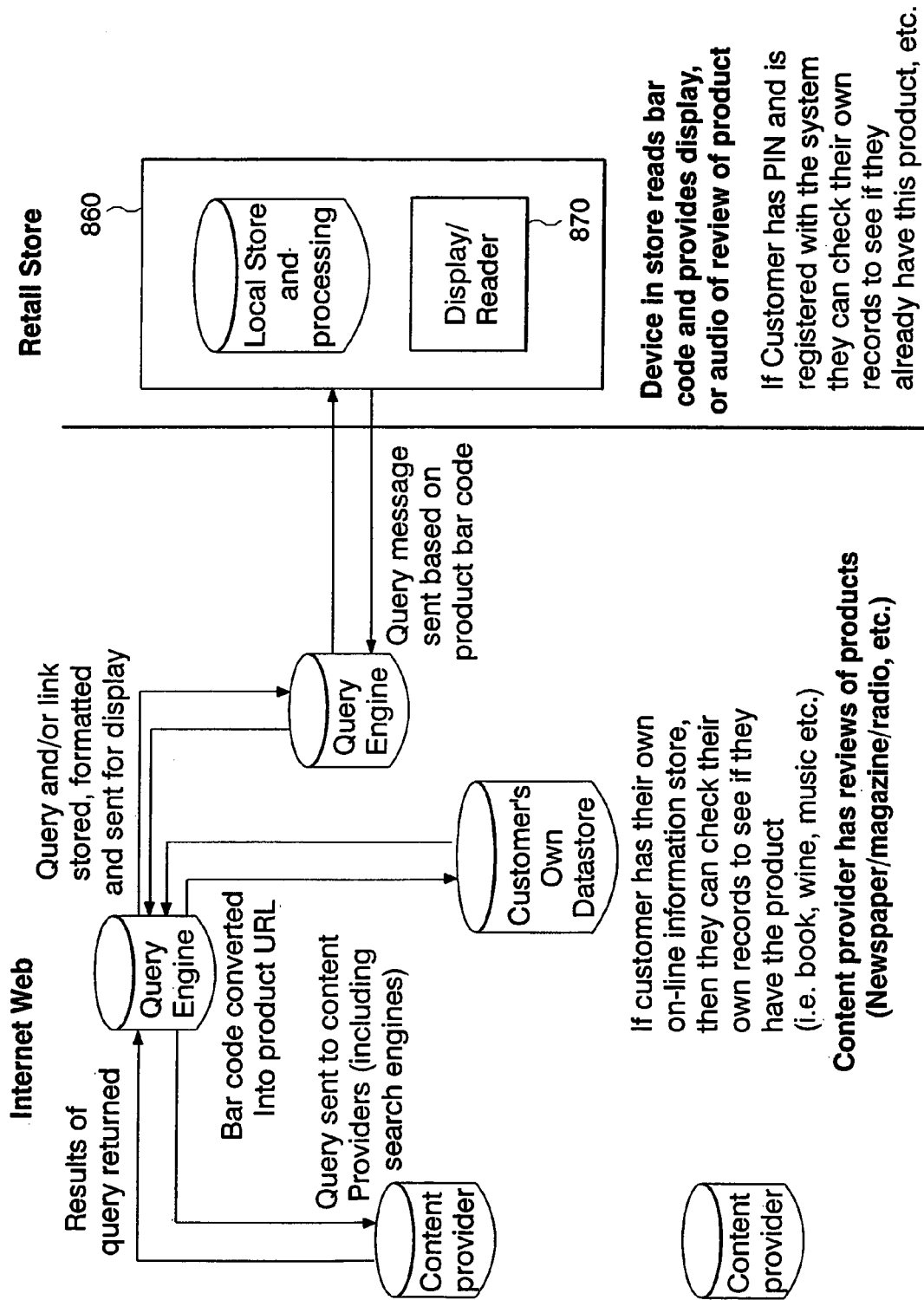

According to yet another aspect of the invention, and with reference to the block diagrams of FIGS. 9 and 10, some or all of the system 10 can be implemented as part of an in-store informational kiosk 860. The kiosk 860 includes a display screen and a bar code scanner 870. If a user has a product they are interested in purchasing and want to obtain further information, the user can scan the product at the kiosk 860. The system will then access and retrieve various reviews and descriptions of the product. The reviews can be stored on a data store in the kiosk 860, located remotely, or both. In addition, the search and retrieval system can be implemented within the kiosk 860. Alternatively, the kiosk 860 can simply be a front-end to a remotely located system accessible, e.g., through a network connection. The user can also be permitted to access their personal database if available to, for example, check and see if they already have the product which was scanned in.

Figure 11:
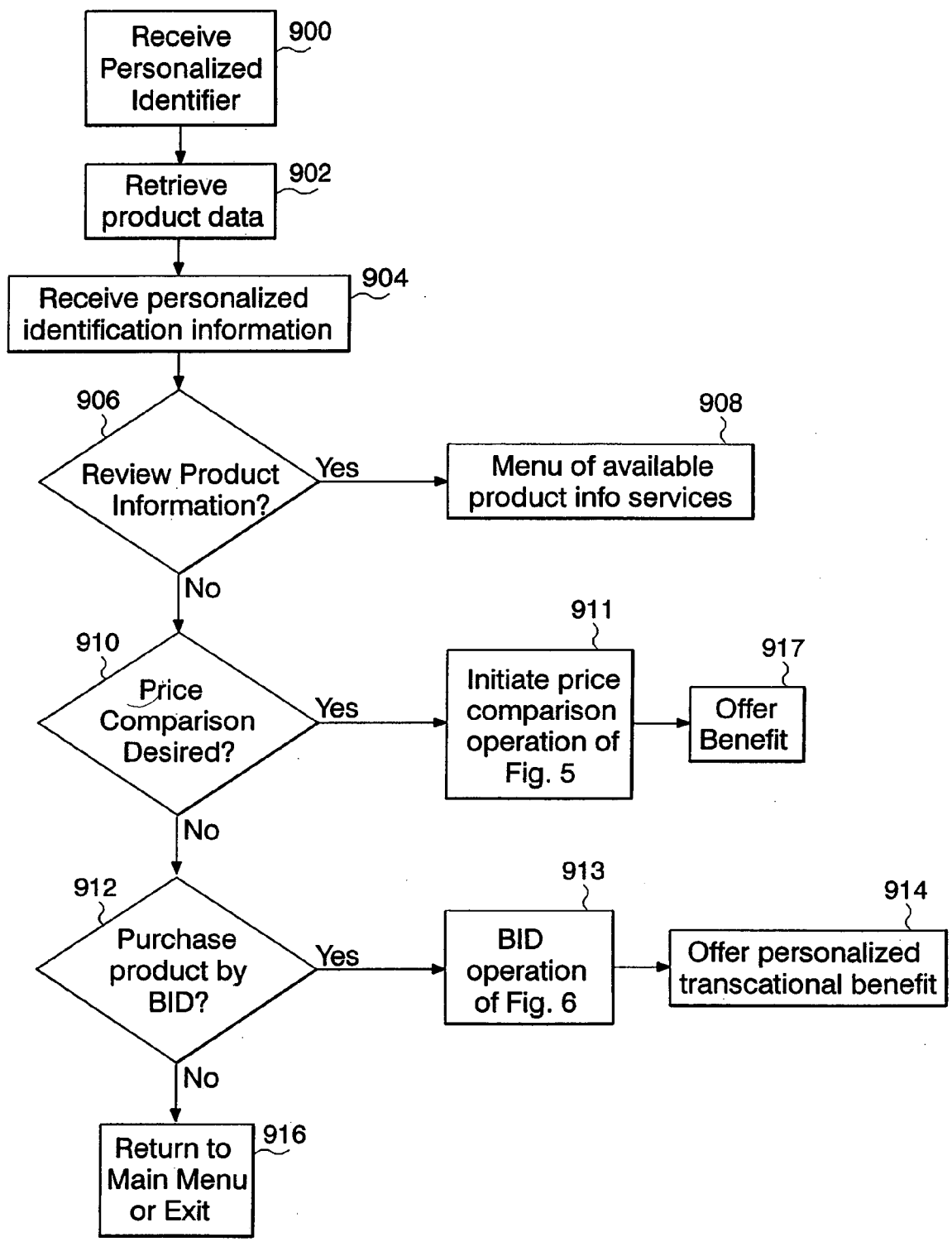
FIG. 11 is a flowchart summarizing the general operation of the personalized transactional benefits module.

In yet another aspect of the present invention as illustrated in FIGS. 2 and 11, a method of providing personalized transactional benefits at a point of purchase over network 11 is provided.

The main module 20 coordinates access to a personalized transactional benefits module 36, which operates in a similar manner as the previously-discussed other function modules (FIG. 2). Access to the personalized transactional benefits module 36 is preferably provided according to a menu-based system wherein a user is presented with various options available and can select which functions to initiate. The personalized transactional benefits module 36 is preferably in communication with other modules of the system 10 and the entire system 10 is configured so as to permit the user (consumer) to be offered personalized transactional benefits for the purchase of an article of commerce based on personalized identification information that is provided by the consumer.

The transactional benefits module 36 preferably includes a personalized identification information database 37 for storing information about the specific user. For example, the identification database 37 can be configured so that the user is able to input the name of affinity programs that the user is a member of, as well as all other information that helps identify or is otherwise useful with respect to the affinity programs. In other words, the user can input and store the name of all affinity groups the user is a member of and also the user can input the user's unique identification number for each affinity program, as well as any other information that the user may find particularly useful. The user may wish to enter expiration dates for any the affinity program memberships so that the user can view when the particular affinity program memberships expire.

The module 36 can be configured to remind the user when a particular affinity program membership is about to terminate so as to alert the user to the situation and permit the user to take all necessary steps to renew the affinity program membership prior to its termination. If this reminder option is selected by the user, the user can enter the amount of advance notice (e.g., two weeks, one month, etc.) that the user wishes to receive prior to the termination of the membership.

In terms of affinity programs, the user can enter any number of affinity programs that the user belongs to and the database 37 can be configured so that the user can categorize or otherwise sort the affinity programs according to categories, etc. For example, many individuals belong to one or more travel related affinity programs, such as airline frequent flyer membership programs, hotel membership programs, etc. These types of memberships can be stored under a category labeled "Travel Related Affinity Programs". The user can create categories to permit all of the user's affinity programs to be easily classified under one or more affinity program categories. Other categories can include "Department Stores" as these types of stores often have different levels of membership with certain perks for each level of membership. The user can also input the direct Internet address for a particular affinity program membership to permit the user to gain access to account information, etc., by simply accessing the Web site of the affinity program by using the link.

The database 37 can also store past purchases of the user. In this respect, the database 37 can be configured to query other databases or modules of the system 10 (which are illustrated in FIG. 2) in order to access information relating to prior purchases of the user. For example, certain merchants may give personalized transactional benefits if the user has ordered a certain amount or quantity of merchandise over a pre-determined period of time. If the merchant is alerted that the user is a bulk buyer, the user may receive a discounted price for the purchase of the merchandise, based upon the prior purchasing history of the user.

Preferably, the module 36 is in communication with price comparison module 34, transaction module 30 and product review module 32, as will be described in greater detail hereinafter.

The general operation of the main program module 20 is summarized in the flowchart of FIG. 3. As summarized in the flowchart of FIG. 11, the personalized transactional benefits module 36 can be configured to receive a personalized identifier that identifies the consumer (step 900), receive product ID (step 902) and receive personalized identification information (step 904) based upon the processing of the personalized consumer identifier received in step 900. Initially, the module 36 receives the product information for the product at issue and this information can include some or all of the data retrieved by the translation module 26, such as the product classifications. If only the product ID is provided, the module 36 can be configured to query the translation module 26 to retrieve additional information.

Figure 6:
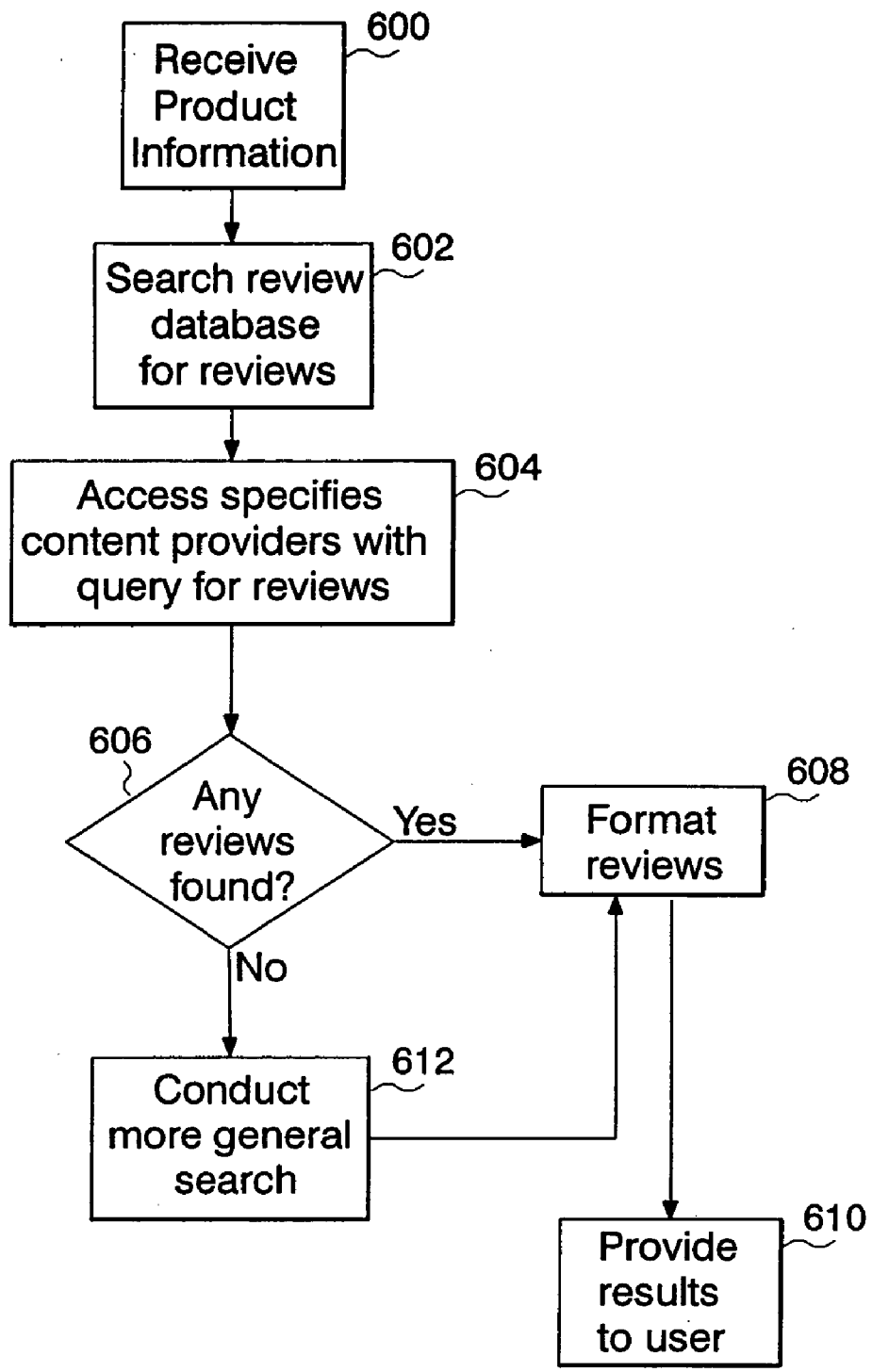
FIG. 6 is a flowchart summarizing the general operation of the product review module.

At step 906, the user is asked whether the user wishes to review product information for the identified product. If the user responds that the user wishes to review product information, the user is presented, at step 908, with a menu listing the product informational options that are available to the user. Preferably, the module 36 communicates with the product review module 32 and product information module 24 so as to permit the user to have access to a wealth of information concerning the product at issue. One of the listings on the menu can be prior reviews provided by prior users of the system, as previously mentioned in the discussion of product review module 32. The user is thus permitted to access review database 33. All options previously described herein with reference to the discussion of product review module 32 are available to the user after the user indicates at step 906 that product information is desired. For example, the operations illustrated in FIG. 6 are available to the user.

The module 36 is also configured to provide a comparative side-by-side review comparing the product at issue to other similar products. A search for similar products is conducted in a database, such as the product review database 33 and the search can be based upon information received from the translation module 26 and database 27 (as by a query). For example and as previously-mentioned, the product identification database 27 can contain data elements, such as cross-references to related or competing products. The information is formatted and then displayed to the user in terms of a side-by-side comparison of the product at issue and related or competing products. Such comparison can include information relating not only to price and the product specifications themselves, but also may contain information as to where each product is available and also user submitted product reviews.

If at step 906, the user indicates that product information is not desired, the user will then be asked at step 910 if the user wishes to obtain a price comparison for the product at issue. If the user indicates that a price comparison is desired, then, at step 911, a price comparison operation is initiated. Preferably, this operation is similar or identical to the operation illustrated in FIG. 5. Thus, the module 36 is configured to query price comparison module 34 (the operation of which is summarized in the flowchart of FIG. 5) for price comparison information. Initially, the module 34 receives product information for the product at issue (which can include some or all of the data retrieved by the translation module 34). The pricing database 35 is then accessed to identify appropriate sources to retrieve price information in accordance with the product classification at issue (Step 502 of FIG. 5). In general, the product price sources will be various on-line merchants of the relevant types of products. Other sources may also be used, such as third-party systems which are specifically designed to provide price comparisons of various specific products, such as books and electronics.

After identifying the appropriate pricing sources, those sources are then queried (step 504 of FIG. 5) and the personalized identification information provided by the user (consumer) is provided to the sources, and the price quotes are received (step 506 of FIG. 5). According to this embodiment, the step of generating a price quote involves an investigation of whether the user is entitled to any transactional benefits on the basis of the personalized identification information that the user provided. For example, by belonging to an affinity group that is recognized by one of the sources, the user may be entitled to a discounted price for purchase of the product at issue or the user may be given the option of redeeming certain rewards held in the user's affinity program account as a means for reducing the price of a product. For example, if the user is purchasing an airline ticket at a travel site or the like, the travel site will be alerted to the frequent flyer programs (affinity programs) that the user belongs to and, if applicable, the user can then be given an option to partially or fully redeem frequent flyer miles as a means of reducing the price of the airline ticket or as a means for completely purchasing the ticket. Other transactional benefits may be offered to the user that do not relate directly to the price of the product at issue but relate to other items, such as shipping and handling. For example, by belonging to a certain preferred affinity program, the user may be given free shipping and handling on a particular purchase from a merchant that recognizes the affinity program. Additional benefits can include the user being given a discount coupon(s) to be used toward a future purchase. For example, for each $100.00 of purchases, the user can be given a $15.00 gift certificate that can be redeemed toward future purchases.

Additional information regarding special offers can also be received or determined (step 508 of FIG. 5). Such information can include limitations placed on the quoted price or limited time offers. The information can be provided by the queried vender. In addition, the price comparison module 34 can be further configured to promote product from specific vendors, e.g., by offering discounts.

The various price quotes are then formatted as needed and then transmitted to the user along with an identification of the source of the quote and perhaps an indication of the availability of the product (step 510 of FIG. 5). In addition to providing the price quotes, sufficient additional information is provided to the user to allow them to immediately submit a purchase request for the product from an identified merchant having an acceptable price. (Step 512 of FIG. 5). Such a purchase can be enabled by providing an Internet link to the merchant or by various other techniques wherein various aspects of the transaction are managed, at least in part, by the system 10.

As part of the cost quote process, at step 917, the consumer is offered any personalized transactional benefits that may apply due to the personalized identification information that the user inputted. If the user does not wish to initiate a price comparison operation, then at step 912, the user is asked whether the user wishes to simply purchase the product using a bid process. If the user indicates that a purchase is desired, a bid process is initiated in step 913 where the user generates and transmits a bid to one or more sources. The bid process is illustrated in detail in FIG. 6. As part of the bid process, the user is offered, at step 914, any personalized transactional benefits that may apply to purchase of this product. If the user does not want to invoke the bid operation, then at step 916, the user returns to the main menu or exits the system.

Figure 12:
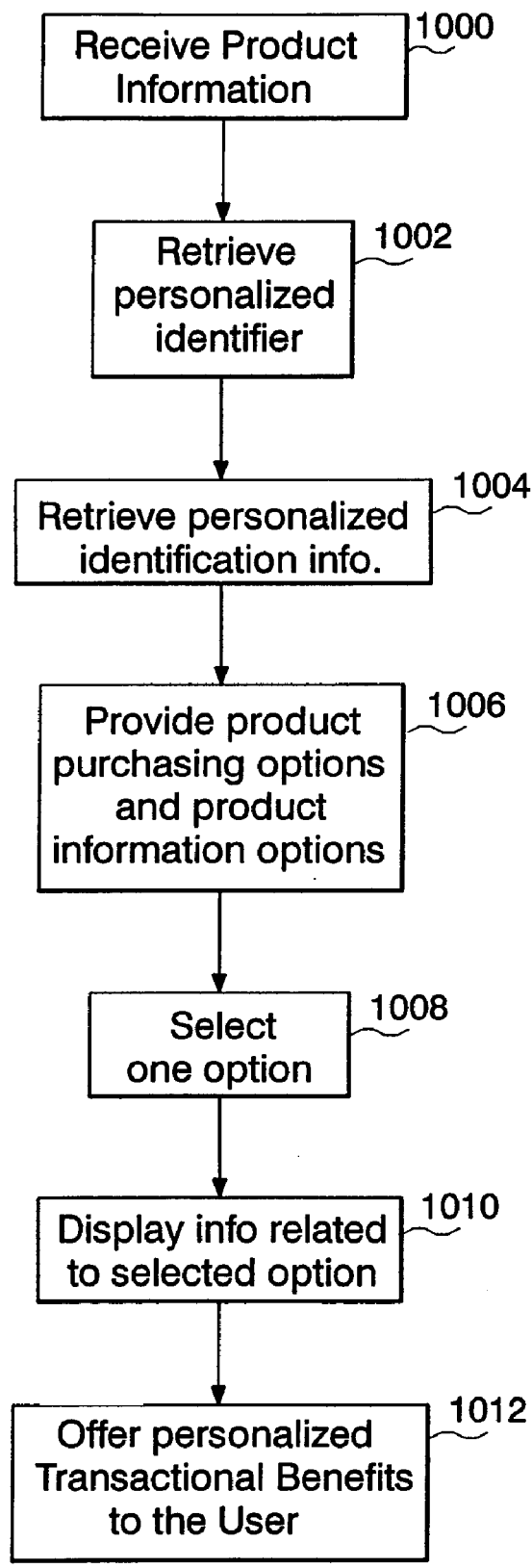
FIG. 12 is a flowchart summarizing the general operation of providing personalized transactional benefits to a user based on personalized identification information supplied by the user.

FIG. 12 is a flowchart that generally illustrates the process of offering personalized transactional benefits for the purchase of an article of commerce based on the personalized identification information provided by the consumer. At step 1000, product information is received. This can be accomplished using any of the methods previously mentioned, including the use of a code symbol reader for scanning the indicia on the product. The indicia is associated with the product identification number (e.g., a UPC) and therefore in a preferred embodiment, the reader is a scanner that detects and reads the UPC of the product, thereby identifying the product. At step 1002, a personalized identifier associated with the code symbol reader is read to thereby identify the consumer using the code symbol reader. The personalized identifier can comprise a unique addressing code that is associated with the user. For example, the unique serial number of the code symbol reader can be registered in a database and serves to identify the user. Other types of personalized identifiers can be used. At step 1004, the personalized identifier is processed to retrieve personalized identification information that is stored on at least one server or the like. The personalized identification information is information that has been provided by the consumer, e.g., affinity program membership information, past purchase information, etc.

At step 1006, the user is presented with a number of product purchasing options and product informational options from which to select from. Each of these options is based upon the product identification number that is associated with the indicia on the article of commerce that was read by the code symbol reader. At step 1008, the user selects one of the options presented in step 1006. At step 1010, information related to the selected option is presented to the user and at step 1012, the user (consumer) is offered personalized transactional benefits for the purchase of the article of commerce (that has been read) based on the personalized identification information provided by the consumer.

In one embodiment, the step 1012 involves determining whether the consumer is entitled to a discount towards the purchase of the read (i.e., scanned) article of commerce based on membership in one or more affinity programs. If the consumer belongs to one or more qualifying affinity programs, the consumer is then offered, at the code symbol reader location (i.e., the point of purchase), to purchase the scanned product at a reduced price. In another embodiment, the step 1012 involves providing the consumer with an option to redeem a membership benefit associated with one affinity program. The membership benefit is equated with a currency value and the consumer makes partial or complete payment of the product by applying the currency value toward a purchase price of the product. For example, a merchant, such as a tire store, may offer a 10% discount on any tire for members of American Automobile Association (AAA), and therefore, when the consumer scans a tire, the present system will determine that the user is a member of AAA (based on the personalized identification information) provided by the consumer) and the price of the tire will be discounted 10%. In this example, the currency value of the membership value is 10% off of the purchase price. The currency value can be expressed not only as a percentage discount but also can be expressed as a dollar amount. For example, the consumers that belong to a particular affinity program may be given a $5.00 discount on any purchase and thus, in this example, the currency value of the membership benefit is $5.00.

In yet another aspect, the personalized transactional benefit can be configured so that the consumer is presented with increased transactional benefit value if the consumer provides additional personalized identification information. For example, if the consumer belongs to a particular affinity program that is recognized by the merchant, the consumer may be entitled to a first discount amount, such as 10% off of the purchase; however, the consumer can be given the option to increase this discount amount to a second discount amount, such as 20%, if the consumer provides additional personalized identification information. For example, the consumer may be asked to complete a product survey or another type of survey and if the consumer agrees to do so, the consumer will then be entitled to the second discount amount of 20%.

Figure 13:
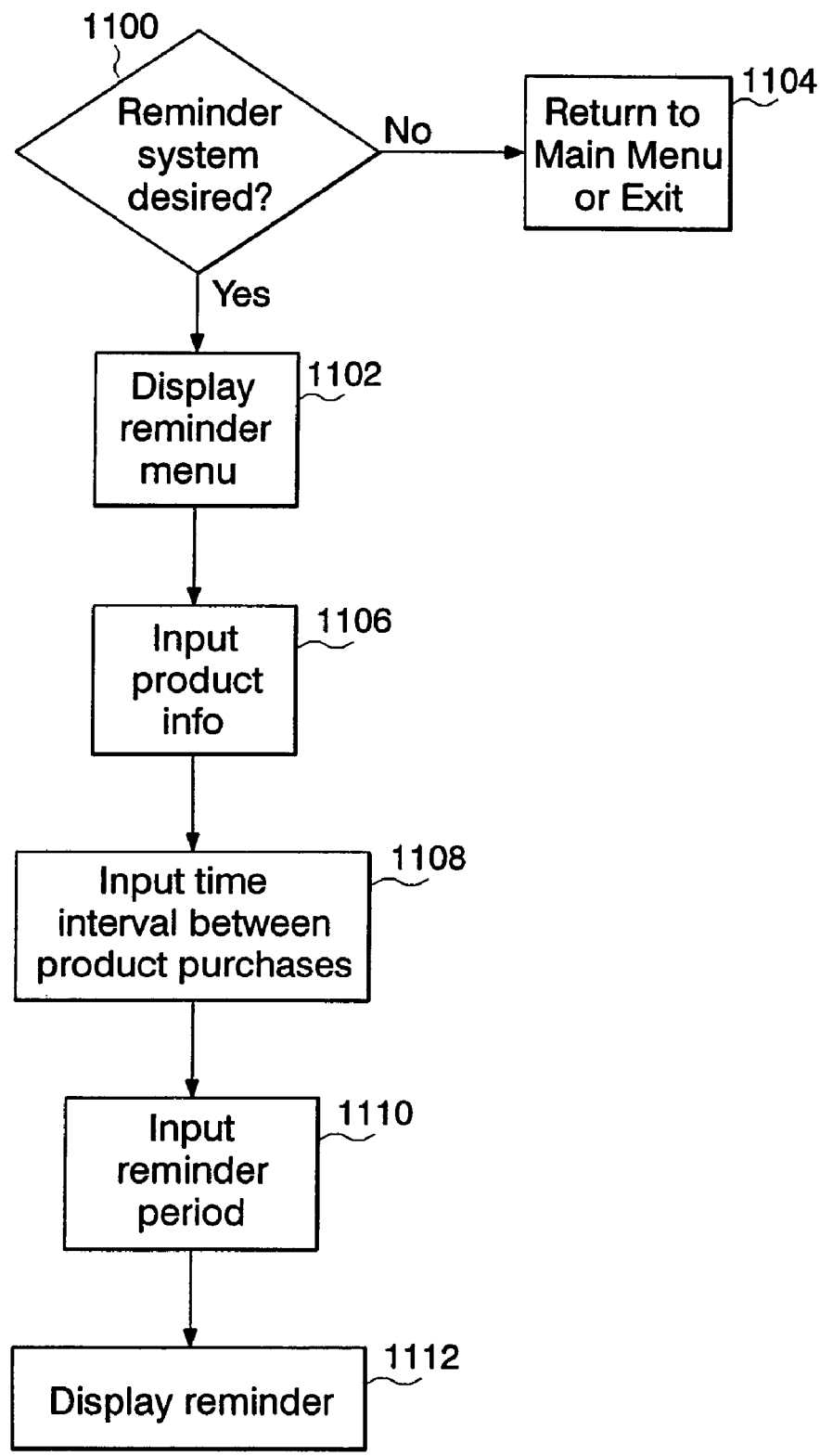
FIG. 13 is a flowchart summarizing the general operation of reminder system.

Yet another aspect of the present system is illustrated in the flowchart of FIG. 13. At step 1100, the user is provided with an option to access a reminder system for setting, retrieving, or modifying a reminder that an inputted recurring purchase is upcoming within a predetermined period of time. If the user selects the option, at step 1102, the user is provided with a reminder menu. If the user does not wish to access the reminder system, the user is then returned to a main option page at step 1104. The reminder menu of step 1102 preferably includes the following menu options: (a) add new reminder (read option); (b) delete existing saved reminder; and (c) modify existing saved reminder. For purpose of illustration, FIG. 13 shows the steps for adding a new reminder by selecting this option at step 1102. At step 1106, the user inputs recurring product information by scanning (or otherwise reading) the product indicia (i.e., bar code) located on the product or its packaging. The user then inputs at step 1108 a desired time interval between purchases of the recurring product. For example, if the user purchases this particular product every month, the user would input that the purchase is monthly. At step 1108, the user can input the time period in terms of a number of days (i.e., 10 days) or in other time period units, such as weeks, months, years, etc. At step 1110, the user then inputs a reminder period at which time at least one of a visual or audio reminder will be displayed on the code symbol reader. For example, for a monthly recurring purchase, the user can select that a reminder is to be generated one week prior to the month ending. The inputted time period depends on the particular preference of the user and can vary from product to product. For example, the user may wish to have more of an advance reminder period for purchasing some products due to the complexity or time consuming nature of obtaining the product, while, for other products, the user may only need 1 or 2 days notice before the purchase is due. At step 1112, the reminder is displayed when the reminder period is reached. The system can be configured so that the reminder will continue until the user takes some affirmative action to acknowledge and remove the reminder. For example, the user can remove the reminder by clicking on an "OK" button. Alternatively, the reminder may be programmed to disappear after a certain time period passes.

The reminder system finds particular utility, in recurring product transactions, such as medications, that are purchased fairly frequently, e.g., monthly.

Figure 14:
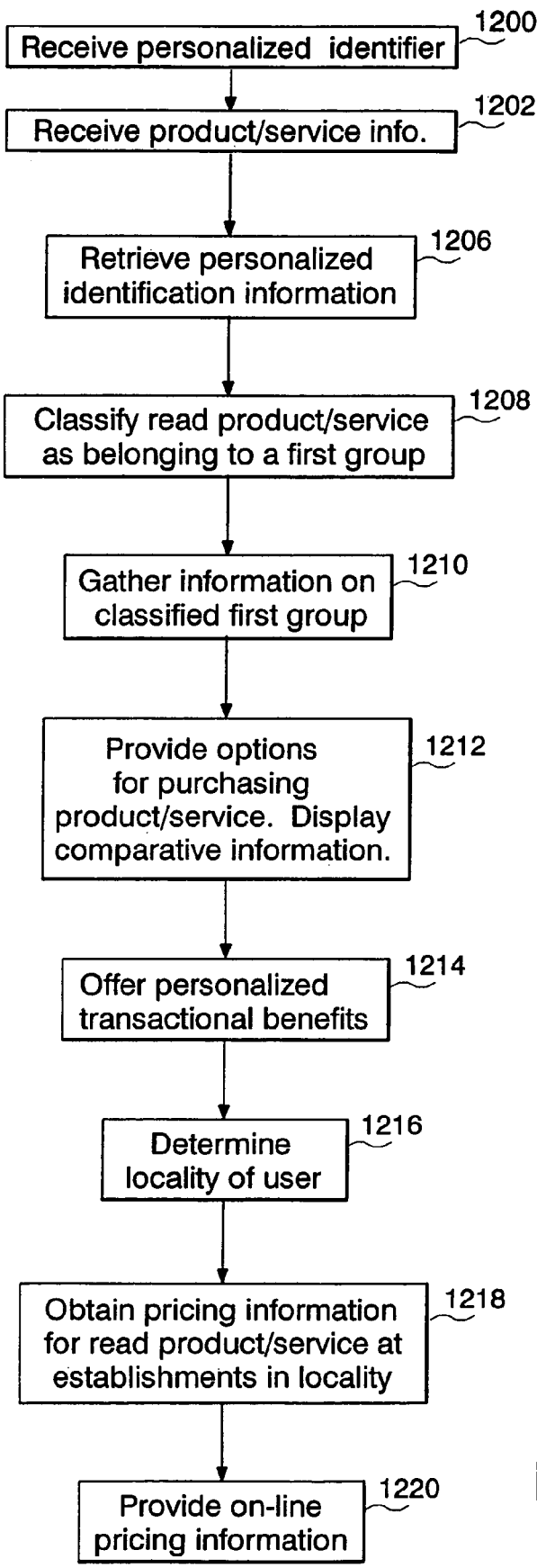
FIG. 14 is a flowchart summarizing the general operation of providing personalized transactional benefits to a user based on personalized identification information supplied by the user and based on the locality of the user.

FIG. 14 illustrates another feature of the present system. At step 1200, the personalized identifier is received for identify the registered user of the code symbol reader. The code symbol reader is used to read indicia provided on the article of commerce (the product) or a service. At step 1202, product/service information is received as a result of using a reader to read identification indicia on the product or material affiliated with the service. At step 1206, the received personal identifier is processed and personalized identification information is retrieved from a stored location (i.e., server location). This personalized identification information is information that the user has inputted and has previously been described in detail. At step 1208, the product or service that has been read by the reader is then classified into a first group. At step 1210, product or service information on the first group is gathered from one or more sources. This information can be general information of the classification that the product or service falls under or the information can be reviews of similar products/services that are similarly classified. At step 1212, options for purchasing the product or service and comparative information are displayed at the code symbol reader location. At step 1214, the user is offered personalized transactional benefits based on the personalized information provided by the consumer.

The method may further contain the following steps. At step 1216, the locality of the consumer is determined. This can be based on user inputted information. For example, the user profile database 23 can contain the address of the user and therefore the locality can be determined based on this information. Preferably, the user is given an option of either using the default mode in which the user's stored address is used to determine the locality or the user can input the present locality where the user is situated using conventional means, such as providing identifying information, such as a zip code, address, phone number, etc. Based on this provided information, the system determines the locality of the user. The locality of the user may also be determined using other conventional techniques, such as using a GPS (global positioning satellite) device/network. For example, the code symbol reader can contain GPS components, which permit the present locality of the user to be easily determined.

Once the locality of the user is determined, at step 1218, pricing information for purchase of the read product or service at one or more establishments located within the consumer's locality. Preferably, the user can define a radius that is used to define the boundaries of the locality. For example, the user can input that the establishment(s) must be within a certain distance, e.g., 5 miles, from the present location of the user. Once the location of the user is determined and any distance limitations are known, a search for the establishments is done. The search is preferably done by accessing a database that lists the establishments by categories based on the types of goods or services of the establishment and also the database contains address information so that it can be determined if the establishment is within the pre-selected distance from the user's location. Further, to permit the user to make an educated decision, at step 1220, the user is preferably provided with on-line pricing information for purchase of the read product or service through one or more servers of the network. In other words, the user is given a chance to compare the local prices in establishments within the user's locale. The on-line pricing is preferably based on the product/service categorization of the read product/service, in that, the system preferably accesses databases, such as pricing database 35, to determine prices for similar competing products in the same category. One of the benefits that may be offered to the user is a cash price for purchasing the product/service in-person at one of the local establishments. In other words, some merchants may offer a cash price that is slightly lower than a purchase price if check or credit card is the means of payment.

Figure 15:
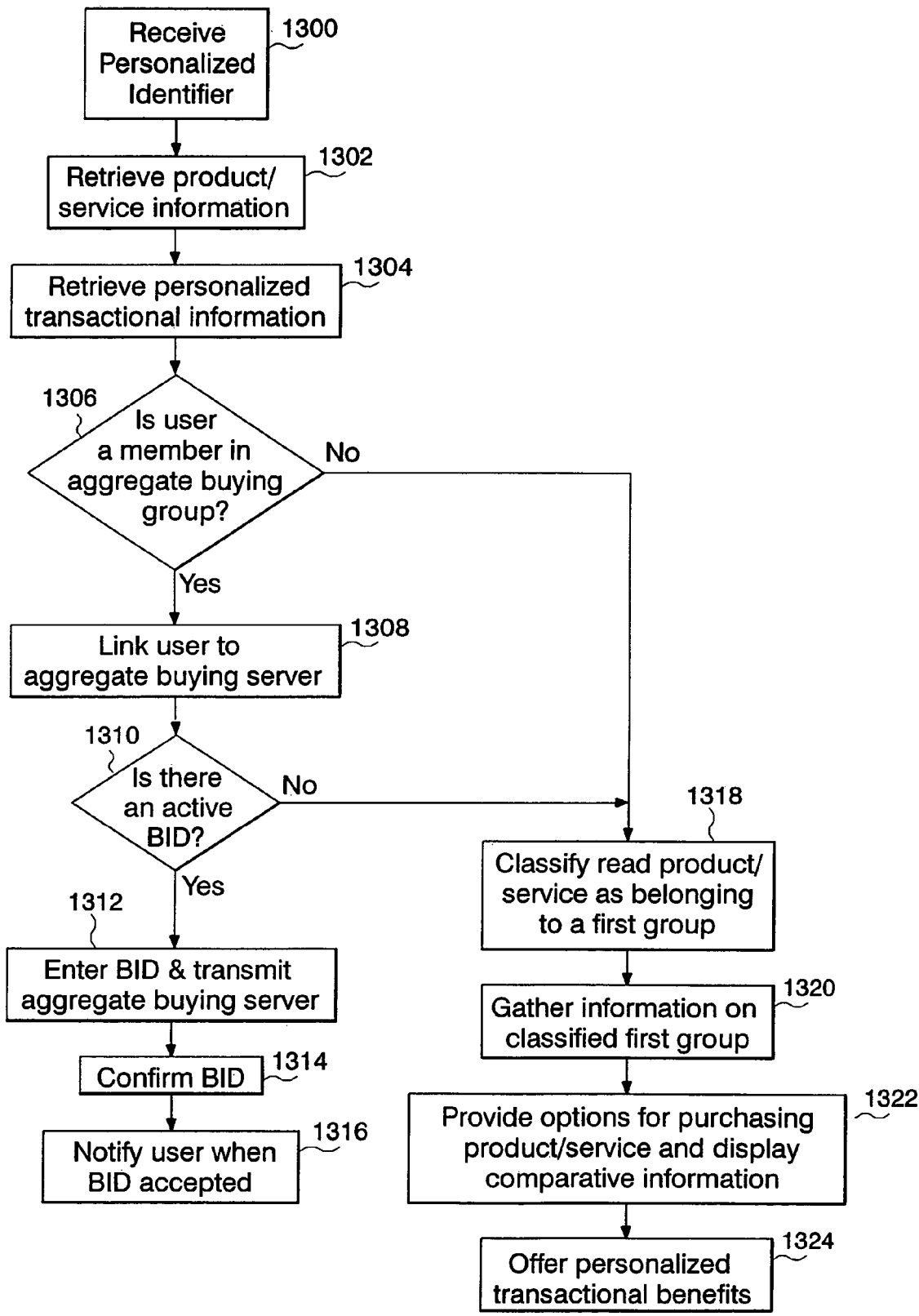
FIG. 15 is a flowchart summarizing the general operation of placing a bid with an aggregate buying group.

FIG. 15 illustrates another feature of the present system. At step 1300, the personalized identifier is received for identifying the registered user of the code symbol reader. The code symbol reader is used to read indicia provided on the article of commerce (the product) or an article associated with a service. At step 1302, product/service information is received as a result of using a reader to read identification indicia on the product or material affiliated with the service. At step 1304, the received personal identifier is processed and personalized identification information is retrieved from a stored location (i.e., server location). This personalized identification information is information that the user has inputted and has previously been described in detail. At step 1306, it is determined whether the user (consumer) belongs to an aggregate buying group. This can be achieved by searching the affinity program membership records that are stored as part of the personalized identification information (stored in the database 37 or the like). Furthermore, the database 37 can contain a section for entering and storing membership information relating to aggregate buying groups that the user may be a member in. At step 1308, if the user belongs to the aggregate buying group (related to or associated with the product/service at issue), the user is linked to an aggregate buying server. At step 1310, it is determined at the aggregate buying server whether the read product or service has an active bid status and the user is permitted to place a bid if the product or service has an active bid status. At step 1312, the user enters the bid through the code symbol reader and it is transmitted to the aggregate buying server where it is processed. At step 1314, the placed bid is confirmed at the code symbol reader. At step 1316, the user is notified when a purchase is made by the aggregate buying group, thus meaning that the user's bid has been accepted.

At step 1318, if the user is not a member of the aggregate buying group or the read product does not have an active status, then the read product or service is classified based on at least the identification number of the product or service as belonging to a first group. At step 1320, product or service information on the first group is gathered from one or more sources. This information can be general information of the classification that the product or service falls under or the information can be reviews of similar products/services that are similarly classified. At step 1322, options for purchasing the product or service and comparative information are displayed at the code symbol reader location. At step 1324, the user is offered personalized transactional benefits based on the personalized information provided by the consumer. These benefits have been described in detail hereinbefore.

The present system thus provides a method of providing personalized transactional benefits at a point of purchase over a network based on personalized identification information provided by a consumer and stored on at least one server and as previously discussed, the information can be stored on more than one server.

In yet another embodiment, the code symbol reader is actually part of a mobile device that includes an inbuilt or utilizes an attached camera to capture the product identification codes. After the image is captured by the camera of the mobile device, the processing of the image into a bar code or other product identifier can be done either locally or remotely. This then triggers the actions selected by the user (reviews, comparative pricing, product information, etc. Thus, it will be appreciated that the mobile device, such as a cellular phone, can be used as a the bar code reader device.

The optical character recognition software which imitates a bar code scanner device in that the camera device captures the bar code itself on the product and then this image (e.g., digitized image) is analyzed using bar code recognition software. As is known, optical character recognition is a process of converting scanned printed images, mark, character, illustration or handwritten text into a format that is identifiable by the computer, such as ASCII. OCR typically involves the use of a scanner for scanning the object typically in the form of printed matter, etc.; however, as in the present case, the system can involve analyzing an image, such as a captured digital image, thereby by-passing the use of a scanner.

The software first reads the captured image and then processes the read image looking for a bar code. If any bar code is found, the bar code is compared with a database that contains stored bar code detection information. Standard optical recognition software is used to compare the image with bar code information that is stored in one or more databases that can be stored over one or more servers. After determining the presence of a bar code and reading the bar code to determine the unique product identifier, this identifier is compared with a product master database in order to precisely determine which product has been imaged by the consumer using the camera of the mobile device.

It will further be appreciated that the current optical character recognition software permits not only the capturing and reading of a bar code using a camera that is part of the mobile device but also it can capture additional images that are later processed to determine the identity of the product. More specifically, the camera can captured an image other than the bar code and the character recognition software takes the captured image and reads different regions thereof to collect information. After reading select coordinate locations (such as those areas where other product identifying indicia, such as a logo or an image, are present) to capture any characters that are found in these locations, the OCR software/hardware component recognizes characters from a registered image. In many systems, this process can be divided into three operational steps: document analysis; character recognition, and contextual processing. Document analysis is the process where text is extracted from the document image; however, in our case, the document image is actually the rollout image of the drug label which is stored as a file in the computer. The character recognition step consists of two main components, namely, the feature extractor and the classifier. The feature extractor (or Intelligent Character Recognition) determines the prescribed templates, which is used to describe all characters. The obtained features are used as input to the character classifier. The classification method is done by comparing an input character image with a set of templates from each character class. This operation is also known as a template matching method. After all templates have been compared, the character's identity is allocated as the identity of the most familiar template.

Yet another classification method is called the structural classification method that uses structural features and decision rules in categorizing characters. Structural features can be described in terms of character strokes, holes or other attributes. For example, the character "B" can be described as a vertical stroke with two holes attached to it on the upper and lower right side. Contextual processing is a post-process operation where information is recognized. For instance, recognizing a street name in an address by correctly recognizing the zip code. Preferably, the post-process follows the application of a spell checker feature to ensure the correct spelling of words.

The OCR system thus compares a detected image with a database of known images and if a match is generated, then the product is identified in this manner and the stored product identifier information is associated with this particular imaged product. In other words, by using a camera that is part of the mobile device or is attached thereto in combination with OCR software, a product can be recognized as a whole (e.g., can of Coke®, a book, CD, DVD, etc.) through the recognition of the icon, artwork or other visual identifier that is part of the product. This recognition can operate remotely through the mobile sending of the image or capture for remote processing. That is, the user may store this image, either locally or remotely as a basis, for example, for comparison of products at different locations. For example, one can capture a picture of the product at location A and can annotate that image (e.g., with the price or additional information) using a keypad of the mobile device and SMS type functionality and then at a second location, this information can be recalled for a comparison.

In addition, the captured image can be used as the basis for comparison on a web search to identify other similar images for the purpose of comparison shopping. The product code or image can be used to validate alternative sources for the product against a geographical database, such that the user can be presented with alternate locations for the product and these locations are then displayed to the consumer.

It will therefore be appreciated that in this aspect of the invention, the user access device 12 is not in the form of a traditional bar code reader that is placed in close proximate relation to the bar code itself but rather the user access device 12 is in the form of a mobile device that has a camera either part of the device or attached thereto. The camera is the means by which indicia, including but not limited to a bar code, logo, or other visual product identifiers, is captured and then processed for determining the identity of the product and associating a product identifier number thereto, thereby permitting the consumer to perform the operations described hereinbefore.

In yet another aspect of the present invention, the system can be configured such that the product or service identification number (ID number) can be linked to a consumer "home" server that contains details for the consumer's specific shopping needs and/or requirements. This shopping information can be entered either manually by the consumer or automatically from home devices, such as a refrigerator, etc., that is configured to perform this function and is in operable communication with the homer server. This type of appliance or home device is in effect a "smart" appliance since it monitors and can automatically instruct when a threshold is reached. It will be appreciated that in this embodiment, the consumer can either make a shopping list that is made up of items that they want or need or alternatively, one or more home devices can provide information as to their requirements. In addition, the home appliance could contain a keypad or the like that is in communication with the home server and on which the consumer can manually enter product identification numbers for products to be added to the shopping list.

The device that is used to collect this information (information collection device) can be the same mobile where the consumer scans or captures the product ID code or takes a picture (image) of the product, before throwing out the empty container and this information is uploaded for them to recall at the potential point of purchase. For example, the mobile device can have a "shopping list" function that is accessible in the main menu and permits the consumer to add certain items that are in demand or required. For instance, the consumer could be using an item that is used sparingly, e.g., furniture polish, and realize that it is close to empty and needs replacement. Since this is an item that is not likely to be in the forefront of the consumer's mind when the consumer is shopping, the consumer can simply use the mobile device and access the shopping list function from the menu and then scan or otherwise read the product ID code. This item will then be uploaded and stored in memory as being an item for purchase and can then be later easily recalled at the point of purchase.

In addition, this information can be compared with a location or store specific information (at the store itself) and further, the information can then be provided to an "agent" or service to gain comparative pricing information from the web.

It will be appreciated that while throughout the specification, the term "server", e.g., "a first server" in reference to the personalized identification information, etc. For example, it is described that the personalized identification information is stored and later retrieved from the It will be expressly understood that the term server includes the embodiment where multiple servers are used to perform one or more functions that are described herein in the practice of the present invention. For example, often times duplicate information is stored on a different server than the original information which is stored on its own server and in addition, it is sometimes desirable due to size, security and/or other considerations for information or data, such as the personalized identification information, to be divided into segments or bits of information which are stored on one more than one sever.

During operation, the operating program or software will then be directed to retrieve this information that is stored in multiple servers using typical addressing protocol, etc. After retrieval of the information from the multiple servers, the personalized information is processed and consumer interaction with each of the servers is shielded from a retail establishment where the scanned article of commerce is located at the point of purchase location. Lastly, as previously mentioned, according to one aspect of the invention, personalized transactional benefits for the purchase of the article of commerce are provided based on the personalized identification information provided by the consumer and stored on the one or more servers. It will therefore be understood that while the entire system can be configured so that a single server is used for storing the personalized identification information, it is likewise equally possible for the personalized identification information to be stored on more than one server that are communicatively connected to a controller which permits the information to be retrieved and then processed.

While the invention has been particularly shown and described with reference to preferred embodiments thereof, it will be understood by those skilled in the art that various changes in form and details may be made therein without departing from the spirit and scope of the invention.

What is claimed is:

1. A method of providing personalized transactional benefits at a point of purchase over a network based on personalized identification information provided by a consumer and stored in a database at one or more servers of the network, wherein a plurality of identification numbers which are used to identify one of the articles of commerce and services is also stored at the one or more servers, each one the articles of commerce and articles associated with the services bearing an indicia on which one identification number is encoded, the method comprising the steps of:
    providing a mobile device having a camera associated therewith, wherein the mobile device is operably connected to the one or more servers of the network, for capturing the indicia on one of the articles of commerce and services, the indicia being associated with the identification number, the mobile device including a personal identifier to identify the consumer to the one or more servers;
    capturing an image of the indicia with the camera;
    processing the captured image with an optical character recognition system to identify the identification number of the product or service by optical recognition of the indicia;
    transmitting the personal identifier to the one or more servers from the mobile device;
    retrieving from the database at the one or more servers the identification number associated with the indicia;
    processing the at least one personal identifier of the consumer at the one or more servers and retrieving from the database the personalized identification information provided by the consumer;
    classifying the read product or service based on at least the identification number as belonging to a first group;
    gathering from one or more other servers information related to the first group;
    displaying at the mobile device location options for purchasing the product or service and comparative information including a comparison between the product or service and one or more other members of the first group; and offering personalized transactional benefits to the consumer from the first server at least in part based on the personalized identification information provided by the consumer and stored in the database at the one or more servers.

2. The method of claim 1, wherein the indicia comprises a bar code which is present in the captured image and the optical character recognition system processes the captured image to produce a bar code number which is then compared to a product/service database for identifying the associated product or service by its identification number.

3. The method of claim 1, wherein the indicia comprises a logo or artwork associated with the product or service.

4. The method of claim 1, wherein the camera is part of the mobile device.

5. The method of claim 1, wherein the camera is a separate component relative to the mobile device; however, it is operably physically connected thereto.

6. The method of claim 1, wherein the recognition and processing of the indicia occurs at a remote location relative to the mobile device as a result of the mobile device sending the captured image to a remote location for processing thereof including recognition of any indicia.

7. The method of claim 1, further including the steps of:
storing the captured image locally as a basis for comparison of the product or service associated with the indicia on the captured image; and
permitting the user to annotate the captured image by using a keypad of the mobile device to add text concerning the product or service associated with the captured image.

8. The method of claim 7, wherein the annotation includes one of a price entry and descriptive product information.

9. The method of claim 1, further including the steps of:
comparing the read product or service with a database of past purchases made by the consumer through the one or more servers;
indicating to the consumer whether the read product or service has been previously purchased by the consumer.

10. The method of claim 9, wherein the database of past purchases is classified into groups based upon at least the identification number and the method further includes the steps of:
searching the first group of the database to see if the consumer has made any prior purchases within the first group, the first group containing the read product or service; and
displaying to the consumer any past purchases made within the first group.

11. The method of claim 1, wherein the mobile device comprises a cellular phone.

12. The method of claim 1, wherein the product identification number is a Universal Product Code.

13. The method of claim 1, wherein the personalized identification information includes a listing of all affinity programs that the consumer is enrolled in and includes a listing of associated identification numbers for each program.

14. The method of claim 13, further including the steps of:
providing the consumer with an option to redeem a membership benefit associated with one affinity program;
equating the membership benefit with a currency value; and
making partial or complete payment of the read product by applying the currency value toward a purchase price of the product.

15. The method of claim 1, wherein the personalized identification information includes a listing of past purchases of the consumer transacted through the one or more servers.

16. The method of claim 1, wherein offering personalized transactional benefits involves the steps of:
determining whether the consumer is entitled to a discount towards the purchase of the scanned product based on membership in one or more of the affinity groups; and
if the consumer belongs to one or more qualifying affinity groups, then offering the consumer at a location of the code symbol reader an option to purchase the scanned product at a reduced price through one of the servers of the network.

17. The method of claim 1, wherein the product information includes comparative information in the form of a side-by-side comparison between the scanned product and other products which are classified alike.

18. The method of claim 1, wherein the products are classified according to the product identification numbers.

19. The method of claim 1, further including the steps of:
providing the consumer with a reminder menu for reminding the consumer that a recurring purchase is upcoming within a predetermined period of time;
entering recurring product information by selecting a read option on the menu and then scanning the indicia on the product;
entering a time interval between purchases of the recurring product;
entering a reminder period at which time at least one of a visual and audio reminder will be displayed on the mobile device; and
displaying the reminder when the reminder period is reached.

20. The method of claim 1, further including the steps of:
entering personalized commentary into the personalized identification information after reading the indicia of the one product; and
offering the consumer the option to view the personalized commentary after the one product is later read by the mobile device.

21. The method of claim 1, wherein providing options for purchasing the product or service includes the steps of:
determining the locality of the consumer;
providing pricing information for purchase of the read product or service at at least one establishment located in the consumer's locality; and
providing on-line pricing information for purchase of the read product or service through one or more servers of the network.

22. The method of claim 1, wherein the service article comprises printed matter having the indicia formed thereon.

23. A method of providing personalized transactional benefits at a point of purchase based on personalized identification information provided by a consumer and stored at at least one sewer of a network, the at least one server also having stored thereat a plurality of identification numbers which are used to identify one of products and services, each one of the products and articles associated with the services bearing an indicia on which one identification number is encoded, the method comprising the steps of:
providing a mobile device having a camera associated therewith and being operably connected to the first server of the network, for imaging the indicia on one of the product and service articles, the indicia being associated with the identification number thereof, the mobile device including a personal identifier to identify the consumer to the first server;

capturing, with the camera, and storing an image of the indicia of one of the product and service articles;

performing optical character recognition on the captured image to determine the product identification information;

transmitting the personal identifier to the at least one server from the mobile device processing the at least one personal identifier of the consumer at the at least one server and retrieving from the database the personalized identification information provided by the consumer;

determining whether the consumer belongs to an aggregate buying group;

linking the consumer with an aggregate buying server if the consumer belongs to the aggregate buying group;

determining at the aggregate buying server whether the read product or service has an active bid status and permitting the consumer to join other members in placing a bid for a predetermined amount of the product or the performance of the service, the aggregate buying server being in communication with other servers which provide purchasing of the product or service;

entering the bid through the mobile device and transmitting the bid to the aggregate buying server where it is processed;

confirming at the mobile device that the bid has been transmitted and the consumer has become a member of an aggregate buying group;

notifying the consumer through the mobile device when a purchase is made by the aggregate buying group; and if the consumer is not a member of the aggregate buying group or the read product or service does not have an active bid status, then:
  classifying the read article or service based on at least the identification number as belonging to a first group;
  gathering from at least one sewer information related to the first group;
  displaying at the mobile device options for purchasing the scanned article or service and comparative information including a comparison between the scanned product or service and one or more other members of the first group; and
  offering personalized transactional benefits to the consumer from the at least one server based at least in part on the personalized identification information provided by the consumer and stored in the database at the at least one server.

24. A method of providing personalized transactional benefits at a point of purchase based on personalized identification information provided by a consumer and stored at at least one server of a network, the at least one server also having stored thereat a plurality of identification numbers which are used to identify one of products and services, each one of the products and articles associated with the services bearing an indicia on which one identification number is encoded, the method comprising the steps of:

providing a mobile device having a camera associated therewith and being operably connected to the first sewer of the network, for imaging the indicia on one of the product and service articles, the indicia being associated with the identification number thereof, the mobile device including a personal identifier to identify the consumer to the first server;

capturing, with the camera, and storing an image of the indicia of one of the product and service articles;

performing optical character recognition on the captured image to determine the product identification information;

transmitting the personal identifier to the at least one server from the mobile device;

processing the at least one personal identifier of the consumer at the at least one server and retrieving from the database the personalized identification information provided by the consumer;

classifying the read article or service based on at least the identification number as belonging to a first group;

gathering from at least one server information related to the first group;

displaying at the mobile device options for purchasing the scanned article or service and comparative information including a comparison between the scanned product or service and one or more other members of the first group; and offering personalized transactional benefits to the consumer from the at least one server based at least in part on the personalized identification information provided by the consumer and stored in the database at the at least one server.

25. The method of claim 24, wherein the indicia is selected from the group consisting of a bar code, a product or service logo, and a visual identifier associated with the product or service.

26. The method of claim 24, further including the step of:
storing the captured image either locally at the mobile device or at a remote location by transmitting the captured image to the remote location using the mobile device, thereby permitting product or service comparison at another location different than the present location.

27. The method of claim 24, further including the steps of:
conducting a search in databases of the one or more servers for images that are substantially identical to the captured image; and
displaying the search results to permit comparison of the product or service represented by the captured image and the products or services represented by the search results.

28. The method of claim 24, further including the steps of:
using the product identification number generated from the captured image or using the captured image itself to validate alternate sources for the product or service against a geographical database that is stored on the at least one server so as to present the user with alternate locations for purchasing the product or service; and
displaying the alternate locations to the user.

29. The method of claim 24, further including the steps of:
providing a consumer home server for containing details related to a consumer's specific shopping needs or requirements;
linking the identification number associated with a targeted product or service to the consumer "home" server; and
entering either manually or automatically a list of product or service identification numbers to compile a shopping list on the homer server that can be accessed by the mobile device at a remote point of purchase location.

30. The method of claim 29, wherein the step of automatically entering the list of product or service identification numbers comprises the step of:
configuring a home appliance such that the home appliance can automatically generate at least in part a list of products that are to be added to the shopping list; and
transferring a product identification number to the home server when the home appliance detects that a characteristic of the product falls below a threshold.

* * * * *

UNITED STATES PATENT AND TRADEMARK OFFICE
CERTIFICATE OF CORRECTION

| | |
|---|---|
| PATENT NO. | : 7,334,728 B2 |
| APPLICATION NO. | : 10/866648 |
| DATED | : February 26, 2008 |
| INVENTOR(S) | : Peter Williams |

It is certified that error appears in the above-identified patent and that said Letters Patent is hereby corrected as shown below:

Column 28
Line 58, please replace "sewer" with --server--.

Column 29
Line 37, please replace "sewer" with --server--.

Column 29
Line 59, please replace "sewer" with --server--.

Signed and Sealed this

Thirtieth Day of September, 2008

JON W. DUDAS
*Director of the United States Patent and Trademark Office*